US010908271B2

(12) United States Patent
Watanabe et al.

(10) Patent No.: US 10,908,271 B2
(45) Date of Patent: Feb. 2, 2021

(54) MINING WORK MACHINE AND OBSTACLE DISCRIMINATION DEVICE

(71) Applicant: HITACHI CONSTRUCTION MACHINERY CO., LTD., Tokyo (JP)

(72) Inventors: Atsushi Watanabe, Tokyo (JP); Takuya Naka, Tokyo (JP); Shinichi Uotsu, Tsuchiura (JP); Koei Takeda, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 92 days.

(21) Appl. No.: 16/330,179

(22) PCT Filed: Sep. 12, 2017

(86) PCT No.: PCT/JP2017/032937
§ 371 (c)(1),
(2) Date: Mar. 4, 2019

(87) PCT Pub. No.: WO2018/156125
PCT Pub. Date: Mar. 29, 2018

(65) Prior Publication Data
US 2019/0219681 A1 Jul. 18, 2019

(30) Foreign Application Priority Data
Sep. 23, 2016 (JP) .................. 2016-185130

(51) Int. Cl.
*G01S 13/04* (2006.01)
*G01S 13/93* (2020.01)
(Continued)

(52) U.S. Cl.
CPC .............. *G01S 13/04* (2013.01); *G01S 13/93* (2013.01); *G08G 1/16* (2013.01); *G01S 2013/932* (2020.01); *G01S 2013/93271* (2020.01)

(58) Field of Classification Search
CPC ........ G01S 13/04; G01S 13/93; G01S 13/931; G01S 2013/932; G01S 2013/93271;
(Continued)

(56) References Cited

U.S. PATENT DOCUMENTS 6,052,079 A * 4/2000 Kitahara .................. G01S 13/34
342/70
6,055,042 A * 4/2000 Sarangapani ......... G01S 13/931
356/4.01
(Continued)

FOREIGN PATENT DOCUMENTS

JP 2004184332 A 7/2004
JP 2009031053 A 2/2009
(Continued)

OTHER PUBLICATIONS

International Search Report of PCT/JP2017/032937 dated Dec. 19, 2017.

*Primary Examiner* — Laura Freedman
(74) *Attorney, Agent, or Firm* — Mattingly & Malur, PC

(57) ABSTRACT

An obstacle determination device mounted on a mining work machine determines whether the state of the mining work machine is a state immediately after progressing or a normal travel state; selects, as a distance threshold provided to determine a non-obstacle, a starting distance threshold if in the state immediately after starting, or a normal distance threshold if in the normal travel state; extracts obstacle candidates on the basis of the result of comparison of the distance at which an obstacle candidate was initially detected with the distance threshold; selects a starting reflec-
(Continued)

tion intensity threshold if the state immediately after starting, or a normal reflection intensity threshold if in the normal travel state; excludes non-obstacles on the basis of the result of comparison of the reception strength of the reflection wave of the remaining obstacle candidates with the reflection intensity threshold; and outputs the remaining obstacle candidates as obstacles.

6 Claims, 16 Drawing Sheets

(51) Int. Cl.
    *G08G 1/16*     (2006.01)
    *G01S 13/931*     (2020.01)

(58) Field of Classification Search
    CPC . G01S 2013/93272; G01S 2013/93275; G01S 17/931; G01S 7/411; G01S 7/414; G01S 7/415; G08G 1/16; E02F 9/261; G05D 1/0223; G05D 1/0257; G05D 2201/021
See application file for complete search history.

(56) References Cited

U.S. PATENT DOCUMENTS

| | | | | |
|---|---|---|---|---|
| 6,321,147 | B1 * | 11/2001 | Takeda | G05D 1/0038 180/167 |
| 7,652,560 | B2 * | 1/2010 | Ohmura | G01S 13/931 340/436 |
| 8,478,493 | B2 * | 7/2013 | Anderson | G05D 1/0272 701/50 |
| 9,290,180 | B2 * | 3/2016 | Ichinose | G05D 1/0257 |
| 9,497,422 | B2 * | 11/2016 | Mitsuta | G08G 1/166 |
| 9,568,608 | B2 * | 2/2017 | Ono | G01S 7/4813 |
| 9,804,606 | B2 * | 10/2017 | Kanai | G05D 1/0289 |
| 9,990,543 | B2 * | 6/2018 | Fukuda | G06K 9/00369 |
| 9,990,851 | B2 * | 6/2018 | Naka | G08G 1/0112 |
| 10,160,383 | B2 * | 12/2018 | Onuma | G08G 1/165 |
| 10,228,454 | B2 * | 3/2019 | Uotsu | G01S 13/931 |
| 10,255,811 | B2 * | 4/2019 | Naka | G01C 21/3407 |
| 10,416,676 | B2 * | 9/2019 | Naka | G01S 13/00 |
| 10,613,218 | B2 * | 4/2020 | Ichinose | G01S 13/08 |
| 10,656,265 | B2 * | 5/2020 | Uotsu | G01S 7/412 |
| 10,663,575 | B2 * | 5/2020 | Watanabe | B60P 1/04 |
| 10,710,587 | B2 * | 7/2020 | Takeda | B60W 30/18127 |
| 2009/0027180 | A1 * | 1/2009 | Shibata | G01S 13/931 340/435 |

FOREIGN PATENT DOCUMENTS

| | | | |
|---|---|---|---|
| JP | 2010048240 A | | 3/2010 |
| JP | 2012227699 A | | 11/2012 |
| JP | 2012229948 A | * | 11/2012 ............ G01S 7/415 |
| JP | 2013186761 A | | 9/2013 |

* cited by examiner

FIG. 5

| Clock time | ID = 1 | | | | ID = 2 | | | | ID = 3 | | | | ... | ID = n | | | |
|---|---|---|---|---|---|---|---|---|---|---|---|---|---|---|---|---|---|
| | Distance | Angle | Relative speed | Reflection intensity | Distance | Angle | Relative speed | Reflection intensity | Distance | Angle | Relative speed | Reflection intensity | | Distance | Angle | Relative speed | Reflection intensity |
| 0 | | | | | 80 | 2.3 | 15 | 10 | | | | | | | | | |
| 0.1 | | | | | 78 | 2.1 | 15 | 11 | | | | | | | | | |
| 0.2 | | | | | 76 | 2.2 | 14 | 10 | | | | | | 20 | 2.0 | 30 | 2 |
| 0.3 | | | | | 75 | 2.1 | 13 | 12 | | | | | | 19 | 1.8 | 28 | 3 |
| 0.4 | | | | | 74 | 2.0 | 14 | 14 | | | | | | 17 | 1.6 | 29 | 1 |
| 0.5 | | | | | 73 | 1.8 | 13 | 13 | | | | | | 16 | 1.4 | 28 | 5 |
| 0.6 | | | | | 71 | 1.6 | 15 | 10 | | | | | | 14 | 1.2 | 30 | 6 |
| 0.7 | | | | | 70 | 1.4 | 14 | 11 | | | | | | 13 | 1.0 | 31 | 4 |
| 0.8 | | | | | | | | | | | | | | 11 | 1.0 | 31 | 3 |
| 0.9 | 45 | 8 | 29 | 3 | | | | | | | | | | 10 | 0.8 | 30 | 2 |
| 1.0 | 43 | 8 | 28 | 2 | | | | | | | | | | 9 | 0.7 | 29 | 1 |
| 1.1 | 42 | 4 | 30 | 4 | | | | | | | | | | 8 | 0.6 | 28 | 2 |
| 1.2 | 41 | 6 | 31 | 3 | | | | | | | | | | | | | |
| 1.3 | 40 | | | | | | | | | | | | | | | | |
| 1.4 | | | | | | | | | | | | | | | | | |

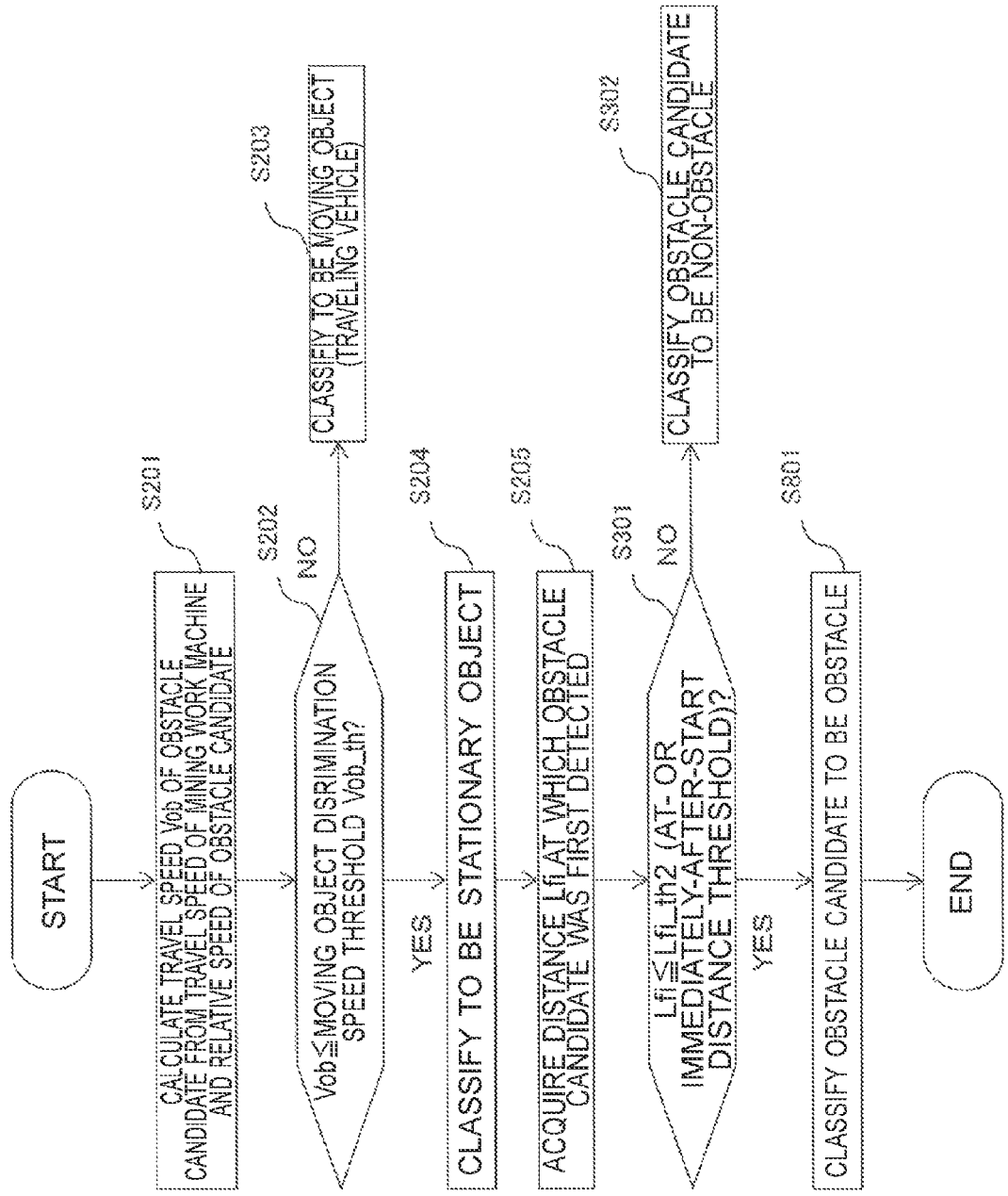

MINING WORK MACHINE AND OBSTACLE DISCRIMINATION DEVICE

TECHNICAL FIELD

This invention relates to a mining work machine and an obstacle discrimination device.

BACKGROUND ART

As a conventional technique relating to the avoidance of a collision with a front vehicle or obstacle, Patent Document 1 discloses an object detection device for a vehicle, that, in order to determine whether an object detected by an obstacle detection device is a vehicle or not, "if plural reflected waves are received from reflecting objects, first determines whether the reflecting objects from which the plural reflected waves have occurred are a single reflecting object, and, if determined to be the single reflecting object through the determination, compares the highest one of intensities of the reflected waves from the single reflecting object with a reference intensity to determine whether the single reflecting object is a vehicle or a non-vehicle. (extracted from the Abstract)".

PRIOR ART DOCUMENT

Patent Document

Patent Document 1: JP 2004-184332 A

DISCLOSURE OF THE INVENTION

Problem to be Solved by the Invention

The surface of an off-road in a mine or the like is bumpy compared with an asphalted environment so that, when a mining work machine such as a mining dump truck travels on a bumpy road surface, the vehicle body is violently jolted in up-and-down and left-and-right directions, and following these jolts, an obstacle detection device, such as a millimeter wave radar, mounted on the vehicle body are also considerably shaken in up-and-down and left-and-right directions. Hence, a millimeter wave or laser light is radiated against a front vehicle from an oblique direction or lateral direction instead of squarely opposing the front vehicle, and the reflection intensity may become lower than that which would be obtained if detected squarely opposing the front vehicle. On the other hand, a reflection intensity from a bump or pothole in the surface of a travel road may be detected higher than that detected from a leveled road surface. Accordingly, there is a possibility that a bump or pothole in a road surface may be falsely discriminated as an obstacle although it is a non-obstacle that inherently does not cause a need for collision avoidance.

At stop, on the other hand, the vehicle body is not jolted. Detection data such as reflection intensities, therefore, differ in characteristics between during traveling and at stop even if the same object, that is, the same vehicle is detected. At stop before a start or while proceeding forward at low speed immediately after a start, it is sufficient if vehicles existing near the mining work machine are detected. However, a mining work machine or the like has a greater height than general automotive vehicles. Therefore, a millimeter wave radar or the like is also installed at an elevated position away from a road surface, so that a detection wave from the millimeter wave radar or the like is radiated on each vehicle in a range near the mining work machine before the detection wave spreads. As a consequence, the radiation area becomes smaller, and the reflection intensity from an obstacle such as a vehicle may become still lower than that available in a usual detection range. Hence, there is a possibility that a front vehicle may not be detected as an obstacle despite a desire to detect it with good accuracy for the avoidance of a collision.

As described above, general automotive vehicles and mining work machines travel on road surfaces of different conditions, and have vehicle bodies of totally different sizes. If an obstacle discrimination technique for general automotive vehicles premised on traveling on paved road surfaces is applied to a mining work machine as is, accuracy decreases when discriminating whether a detected obstacle is a real obstacle or anon-obstacle. Under these circumstances, there is a desire for the development of an obstacle discrimination technique suited for mining work machines.

With the foregoing circumstances in view, the object of the present invention is the provision of an obstacle discrimination technique suited for mining work machines, which travel under off-road environments including bumps and potholes in road surfaces.

Means for Solving the Problem

To accomplish the above-described object, the present invention includes the configurations described in the claims. Presenting an example of the configurations, the present invention is characterized by a mining work machine comprising a peripheral detection sensor configured to radiate an electromagnetic wave forward in a traveling direction, to receive reflected waves from each obstacle candidate, to detect reception intensities of the reflected waves and distances from a mining work machine to the obstacle candidate, and to output obstacle information including the detected reception intensities of the reflected waves and the detected distances, a speed sensor that detects a travel speed of the mining work machine, an obstacle discrimination device connected to the peripheral detection sensor and speed sensor, respectively, and configured to discriminate the obstacle candidate as an obstacle or a non-obstacle, and a vehicle control device connected to the obstacle discrimination device, and configured to acquire an output from the obstacle discrimination device, wherein the obstacle discrimination device comprises a mining work machine state determination section configured to determine, based on the travel speed acquired from the speed sensor, whether the mining work machine is in a state at or immediately after a start, including a stopped state and a state immediately after a start, in which the mining work machine is traveling equal to or lower than a preset speed threshold for the determination of the state of the mining work machine (which may hereinafter be referred to as "preset mining work machine-state determination speed threshold"), or in a normal travel state in which the mining work machine is traveling faster than the mining work machine-state determination speed threshold, a distance filter section that performs filtering processing on the obstacle information based on the distance at which the obstacle candidate was first detected by the peripheral detection sensor, and a reflection intensity filter section that performs filtering processing on the obstacle information based on the reception intensities of the reflected waves from the obstacle candidate; the distance filter section comprises a distance threshold selector configured to select a distance threshold at or immediately after a start (which may hereinafter be referred to as "at- or immediately-after-start distance threshold") as a distance threshold set to determine the obstacle candidate to be a non-obstacle if the mining work machine has been determined by the mining work machine-state determination section to be in the state at or immediately after the start, or to select a normal distance threshold as a distance threshold set to determine the obstacle candidate to be a non-obstacle if the mining work machine has been determined by the mining work machine-state determination section to be in the normal travel state, a distance comparator that compares the distance, at which the obstacle candidate was first detected by the peripheral detection sensor, with the distance threshold selected by the distance threshold selector, a first non-obstacle determination processor configured to determine, based on a comparison result by the distance comparator, whether the obstacle candidate is a non-obstacle, and a first output processor configured to exclude the obstacle information, which indicates the obstacle candidate determined to be the non-obstacle based on a determination result by the first non-obstacle determination processor, and to output, to the reflection intensity filter section, the obstacle information which indicates the obstacle candidate not determined to be the non-obstacle based on the comparison result by the first non-obstacle determination processor; and the reflection intensity filter section comprises a reflection intensity threshold selector configured to select a reflection intensity threshold at or immediately after a start (which may hereinafter be referred to as "at- or immediately-after-start reflection intensity threshold") as a reflection intensity threshold set to determine the obstacle candidate to be a non-obstacle if the mining work machine has been determined to be in the state at or immediately after the by the mining work machine-state determination section, or to select a normal reflection intensity threshold as a reflection intensity threshold set to determine the obstacle candidate to be a non-obstacle if the mining work machine has been determined to be in the normal travel state by the mining work machine-state determination section, a reflection intensity comparator that compares the reception intensity of the reflected wave in the obstacle information acquired from the first output processor with the reflection intensity threshold selected by the reflection intensity threshold selector, a second non-obstacle determination processor configured to determine, based on a comparison result by the reflection intensity comparator, whether the obstacle candidate is a non-obstacle, and a second output processor configured to exclude the obstacle information, which indicates the obstacle candidate determined to be the non-obstacle based on a determination result by the second non-obstacle determination processor, and to output, to the vehicle control device, the obstacle information which indicates the obstacle candidate not determined to be the non-obstacle based on the determination result by the second non-obstacle determination processor.

Advantageous Effects of the Invention

According to the present invention, it is possible to provide an obstacle discrimination technique suited for a mining work machine, which travels under off-road environments including bumps and potholes in road surfaces. Problems, configurations and advantageous effects other than those described above will become apparent from the following description of an embodiment.

BRIEF DESCRIPTION OF THE DRAWINGS

FIG. 5 is a table presenting one example of detection data by a front millimeter wave radar and a rear millimeter wave radar.

FIG. 16 is a flow chart illustrating a flow of Example 2 of obstacle candidate discrimination processing in a state at or immediately after a start.

MODES FOR CARRYING OUT THE INVENTION

Figure 1:
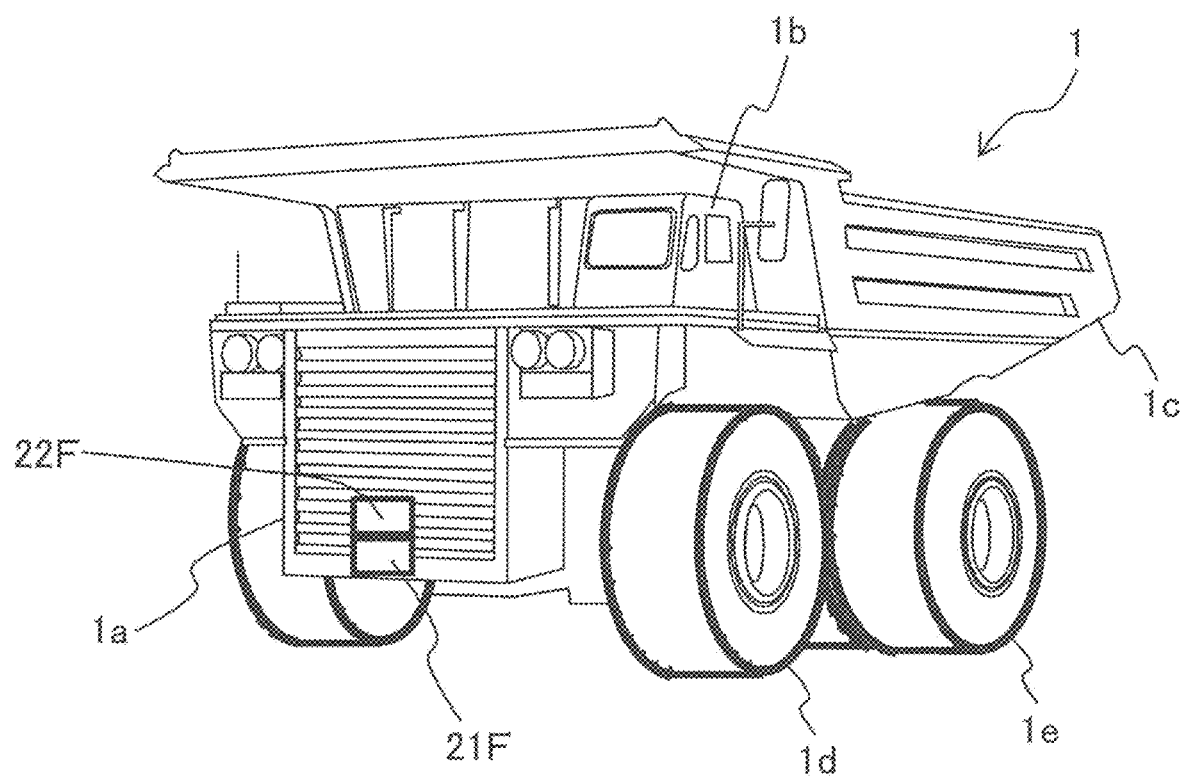
FIG. 1 is a perspective view showing an outline of a dump truck.
Figure 2:
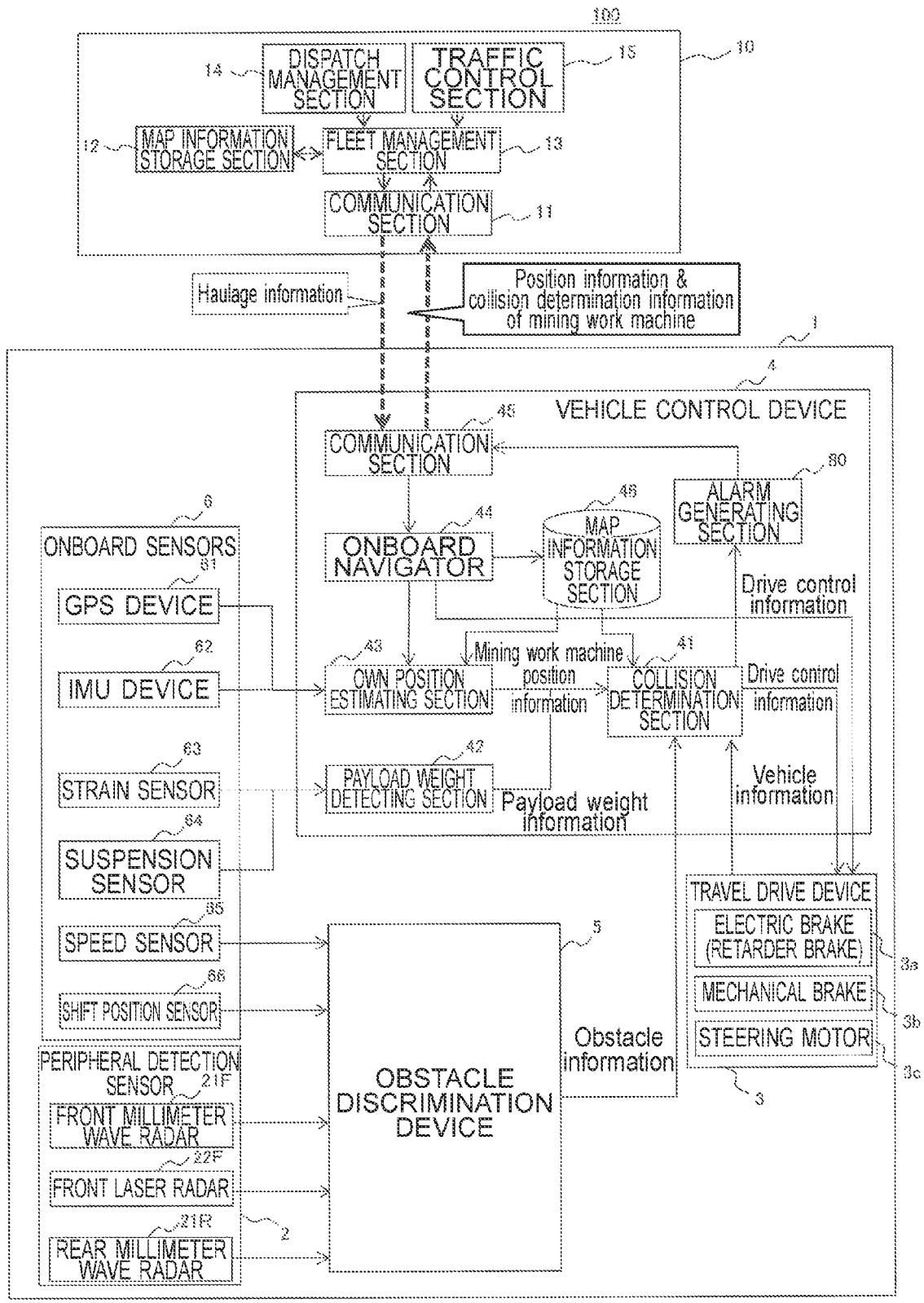
FIG. 2 is a block diagram illustrating functional configurations of a control server and the dump truck, which make up an autonomous travel dump truck system.
Figure 3:
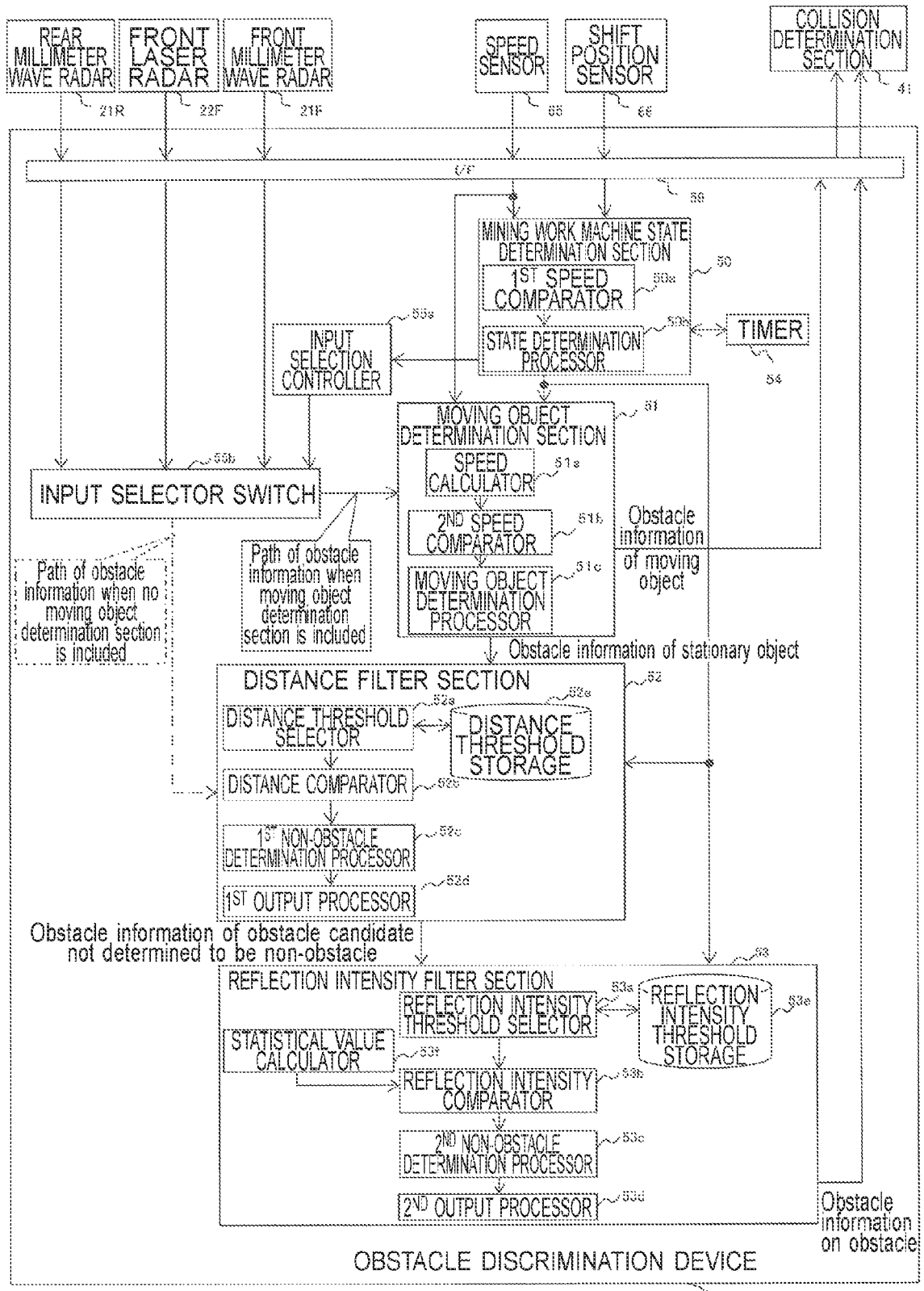
FIG. 3 is a block diagram illustrating an internal configuration of an obstacle discrimination device.

The embodiment of the present invention will hereinafter be described with reference to the drawings. In the following embodiment, a description will be made by taking an autonomous travel dump truck (hereinafter simply called "dump truck"), which autonomously travels in a mine, as one example of a mining work machine, although the mining work machine is not limited to a dump truck but may also be a hydraulic excavator, grader or bulldozer. Further, the mining work machine may also be a so-called manned dump truck that travels according to control by an operator. Referring first to FIGS. 1 to 3, a description will be made about the configuration of an autonomous travel dump truck system in this embodiment. FIG. 1 is a perspective view showing an outline of a dump truck. FIG. 2 is a block diagram illustrating functional configurations of a control server and the dump truck, which make up an autonomous travel dump truck system. FIG. 3 is a block diagram illustrating an internal configuration of an obstacle discrimination device.

As shown in FIG. 1, the dump truck 1 includes a vehicle body 1a, a cab 1b disposed above a front section of the vehicle body 1a, a vessel 1c mounted pivotally up and down on the vehicle body 1a, hoist cylinders (not shown) that raise or lower the vessel 1c, and left and right, front wheels 1d and rear wheels 1e on which the vehicle body 1a is supported for traveling.

Installed on a front wall of the vehicle body 1a are a front millimeter wave radar 21F and a front laser radar 22F, which correspond to front peripheral detection sensors, as peripheral detection sensors 2 (see FIG. 2) for monitoring forward to detect front obstacles. Similarly, as illustrated in FIG. 2, installed on the back of the vehicle body 1a of the dump truck 1 is a rear millimeter wave radar 21R, which corresponds to a rear peripheral detection sensor, for monitoring backward to detect rear obstacles. The front millimeter wave radar 21F, rear millimeter wave radar 21R and front laser radar 22F each radiate an electromagnetic wave and receive reflected waves to detect front vehicles such other dump trucks 1 and the like. In FIG. 2, a sensor fusion architecture with the front millimeter wave radar 21F, rear millimeter wave radar 21R and front laser radar 22F mounted therein is illustrated as the peripheral detection sensors 2, but the peripheral detection sensors 2 may be configured of a millimeter wave radar alone or a laser radar alone. Further, instead of the rear millimeter wave radar 21R, a laser radar may be used for the detection of rear obstacles.

Each of the front millimeter wave radar 21F, rear millimeter wave radar 21R and front laser radar 22F radiates an electromagnetic wave forward in a traveling direction, receives reflected waves from each obstacle candidate, detects reception intensities of the reflected waves, distances Lfi from the mining work machine to the obstacle candidate and a relative speed of the obstacle candidate to the mining work machine, and outputs obstacle information including the reception intensities of the reflected waves, distances Lfi and relative speed so detected.

The term "obstacle candidate" as used herein means a reflecting object for electromagnetic waves, which is included in the obstacle information outputted from the peripheral detection sensors 2 but has not been subjected to obstacle/non-obstacle discrimination at an obstacle discrimination device 5 (see FIG. 5) to be described subsequently herein. If the front millimeter wave radar 21F or the rear millimeter wave radar 21R has received a reflected wave, there are two possible situations, one needing the dump truck 1 to take a collision avoidance measure (for example, a situation where a front vehicle or a rear vehicle has been detected), the other needing no collision avoidance measure because the reception of the reflected wave was from a bump or pothole in a road surface. Accordingly, in this embodiment, reflecting objects which are included in a result outputted from the front millimeter wave radar 21F or rear millimeter wave radar 21R but have not been subjected to discrimination processing by the obstacle discrimination device 5 are called "obstacle candidates". Among these obstacle candidates, those which need collision avoidance measures are called "obstacles" while those which need no collision avoidance measures are called "non-obstacles". A description will hereinafter be made by placing a focus on a situation where obstacle candidates are detected by the front millimeter wave radar 21F or the rear millimeter wave radar 21R, although similar results are also obtained in a situation where obstacle candidates are detected by the front laser radar 22F or in a situation where obstacle candidates are detected by the front millimeter wave radar 21F and the front laser radar 22F.

As depicted in FIG. 2, an autonomous travel dump truck system 100 is configured of a control server 10 and the dump truck 1, which are connected for communication via wireless communication lines. On the dump truck 1, the peripheral detection sensors 2, a travel drive device 3, a vehicle control device 4, the obstacle discrimination device 5, and onboard sensors 6 are mounted. The vehicle control device 4 includes a collision determination section 41, a payload weight detecting section 42, an own position estimating section 43, an onboard navigator 44, a communication section 45, a map information storage section 46, and an alarm generating section 80. In this embodiment, an example in which the vehicle control device 4 and the obstacle discrimination device 5 are configured as discrete modules is illustrated, but these devices may be configured as an integral unit, for example, by using an engine control unit (ECU).

The onboard sensors 6 include a GPS device 61 as a position detecting device that detects the position of the dump truck 1, i.e., the mining work machine, an inertial measurement unit (IMU) 62 for detecting an acceleration and inclination of the vehicle body 1a, a strain sensor 63, a suspension sensor 64, a speed sensor 65 that detects a travel speed V of the dump truck 1, and a shift position sensor 66 that detects a shift position which selects the traveling direction of the dump truck 1. The speed sensor 65 may be configured with a wheel rotational-speed sensor, which detects a rotational speed of one of the front wheels 1d that function as driven wheels, and detects the speed of the dump truck 1 from the rotational speed.

The obstacle discrimination device 5 switches its processing details depending on whether the mining work machine is in a normal travel state or in a state at or immediately after a start. The term "state at or immediately after a start" as used herein means a travel state from a stopped state, in other words, a travel speed of 0 km/h to a speed at which a filter to be used at the obstacle discrimination device 5 to discriminate obstacles and non-obstacles is switched (hereinafter called "the mining work machine-state determination speed threshold"). On the other hand, the term. "normal travel state" means a state in which the mining work machine is traveling at a speed faster than the mining work machine-state determination speed threshold.

As a configuration for the above-described function, the obstacle discrimination device 5 includes, as illustrated in FIG. 3, the mining work machine-state determination section 50, a moving object determination section 51, a distance filter section 52, and a reflection intensity filter section 53, a timer 54, an input selection controller 55a, an input selector switch 55b, and an I/F 59.

The obstacle discrimination device 5 is connected, via the I/F 59, to the front millimeter wave radar 21F, the rear millimeter wave radar 21R, the speed sensor 65, the shift position sensor 66, and the collision determination section 41 in the vehicle control device 4. If a detection result by the front laser radar 22F is used in obstacle discrimination processing, the front laser radar 22F is connected to the I/F 59.

Inputted to the mining work machine-state determination section 50 are travel speed information of the mining work machine from the speed sensor 65 and traveling direction information of the mining work machine from the shift position sensor 66. The mining work machine-state determination section 50 includes a first speed comparator 50a that compares the travel speed of the mining work machine with the mining work machine-state determination speed threshold V_th1, and a state determination processor 50b that determines, based on a comparison result by the first speed comparator 50a, whether the dump truck 1 is in a normal travel state or in a state at or immediately after a start. The state determination processor 50b outputs a determination result of the mining work machine travel state to the moving object determination section 51, distance filter section 52 and reflection intensity filter section 53.

The mining work machine-state determination section 50 is connected to the timer 54. The timer 54 measures a duration Ts after the travel speed V of the mining work machine has decreased to the mining work machine-state determination speed threshold or lower, and outputs information, which indicates the duration Ts, to the mining work machine-state determination section 50. The state determination processor 50b acquires the information which indicates the duration Ts, and may determine the mining work machine to be in a state at or immediately after a start if the duration Ts is equal to or longer than a stopped duration threshold T_th set to determine that the mining work machine is in the state at or immediately after the start.

As an alternative, the state determination processor 50b may also determine the mining work machine to be in a state at or immediately after a start if the duration Ts is equal to or longer than the stopped duration threshold T_th and the travel speed V of the mining work machine is lower than a low speed determination speed threshold still smaller than the mining work machine-state determination speed threshold V_th1.

Inputted to the moving object determination section 51 are the travel state (normal travel state/travel state at or immediately after the start) of the mining work machine from the mining work machine-state determination section 50, and travel speed information of the mining work machine from the speed sensor 65. Further, obstacle information is inputted from the front millimeter wave radar 21 and rear millimeter wave radar 21R. The moving object determination section 51 includes a speed calculator 51a that calculates the travel speed of the obstacle candidate based on the travel speed of the mining work machine and the relative speed of the obstacle candidate, a second speed comparator 51b that compares the travel speed of the obstacle candidate with a speed threshold for the travel speed of the obstacle candidate for classifying the obstacle candidate into a moving object or a stationary object (moving object discrimination speed threshold Vob_th), and a moving object determination processor 51c that determines the obstacle candidate to be a stationary object or a moving object (traveling vehicle) based on a comparison result by the second speed comparator 51b. The moving object discrimination speed threshold Vob_th can be set as a threshold that varies depending on whether the mining work machine is in a normal travel state or in a state at or immediately after a start. The moving object determination section 51c outputs obstacle information of the moving object, as an obstacle, to the collision determination section 41, or outputs information of the obstacle candidate, which has been discriminated as the stationary object, to the distance filter section 52.

The distance filter section 52 performs filtering processing on the corresponding obstacle information based on the distance at which the obstacle candidate was first detected by the peripheral detection sensor 2. To exclude non-obstacles having no risk of collision, such as road surfaces, from obstacle candidates determined as stationary objects at the moving object determination section 51, the distance filter section 52 discriminates each stationary object, which was first detected at a preset distance or shorter, to be a non-obstacle. In a state at or immediately after a start, each stationary object first detected at the preset distance or longer is determined to be a non-obstacle. The term "preset distance" as used herein means a distance threshold set to distinguish vehicles and non-vehicles (for example, road surfaces and shoulders). As a vehicle has higher reflection intensity than a non-vehicle, the vehicle begins to be detected from a farther distance. Based on this characteristic, a distance threshold to distinguish a vehicle and a non-vehicle can be set at a distance where the non-vehicle begins to be first detected.

The distance filter section 52 includes a distance threshold selector 52a, a distance comparator 52b, a first non-obstacle determination processor 52c, a first output processor 52d, and a distance threshold storage 52e.

If the mining work machine-state determination section 50 has determined that the mining work machine is in a state at or immediately after a start, the distance threshold selector 52a selects, as a distance threshold set to distinguish as a vehicle or a non-vehicle, a start distance threshold Lfi_th2, which is to be applied at the time of the state at or immediately after the start, among distance thresholds stored in the distance threshold storage 52e. If the mining work machine-state determination section 50 has determined that the mining work machine is in a normal travel state, on the other hand, the distance threshold selector 52a selects, as a distance threshold set to distinguish as a vehicle or a non-vehicle, a normal distance threshold Lfi_th1, which is to be applied at the time of the normal travel state. As the vehicle is placed as an obstacle here, the distance threshold set to distinguish as the vehicle or the non-vehicles may be rephrased as the distance threshold set to determine as the non-obstacle.

The distance comparator 52b compares the distance, at which the obstacle candidate was first detected, with the distance threshold selected by the distance threshold selector 52a.

The first non-obstacle determination processor 52c determines, based on a comparison result by the distance comparator 52b, whether the obstacle candidate is other than an object to be outputted, and outputs its result to the first output processor 52d.

The first output processor 52d excludes the obstacle information which indicates each obstacle candidate determined to be a non-obstacle based on the determination result by the first non-obstacle determination processor 52c, but outputs, to the reflection intensity filter section 53, the obstacle information of each obstacle candidate not determined to be a non-obstacle.

The reflection intensity filter section 53 includes a reflection intensity threshold selector 53a, a reflection intensity comparator 53b, a second non-obstacle determination processor 53c, a second output processor 53d, a reflection intensity threshold storage 53e, and a statistical value calculator 53f. The reflection intensity filter section 53 distinguishes each obstacle as a vehicle or a non-vehicle based on a calculated statistical value of the reflection intensities, and excludes the obstacle candidate as a non-obstacle if it is a non-vehicle. Examples of the statistical value of the reflection intensities include cumulative average RIave, moving average RIavem, cumulative variance and moving variance RIstdm of the reflection intensities. For the calculation of the statistical value of the reflection intensities and the distinction between vehicles and non-vehicles based on reflection intensity information, different methods can be adopted depending on the normal travel state or the state at or immediately after the start.

The reflection intensity threshold storage 53e stores the reflection intensity threshold to be used in the state at or immediately after the start and the reflection intensity threshold to be used in the normal travel state. If the mining work machine-state determination section 50 has determined the mining work machine to be in the state at or immediately after the start, the reflection intensity threshold selector 53a selects, among the reflection intensity thresholds stored in the reflection intensity threshold storage 53e, the reflection intensity threshold, which is to be applied at the time of the state at or immediately after the start, as a reflection intensity threshold set to distinguish as a vehicle or a non-vehicle. If the mining work machine-state determination section 50 has determined the mining work machine to be in the normal travel state, on the other hand, the reflection intensity threshold selector 53a selects the reflection intensity threshold, which is to be applied at the time of the normal travel state, as a reflection intensity threshold set to distinguish as a vehicle or a non-vehicle.

The statistical value calculator 53f calculates the statistical value of reflection intensities based on the reception intensities of reflected waves from the obstacle candidate. This feature is not essential if the values of the reflection intensities are used, as are, without using the statistical value.

The reflection intensity comparator 53b compares the statistical value of the reflection intensities from the obstacle candidate with the reflection intensity threshold selected by the reflection intensity threshold selector 53a.

The second non-obstacle determination processor 53c determines, based on a comparison result by the reflection intensity comparator 53b, whether the obstacle candidate is other than an object to be outputted.

The second output processor 53d excludes, based on a determination result by the second non-obstacle determination processor 53c, the obstacle information which indicates the obstacle candidate determined to be a non-obstacle. The second output processor 53d, however, outputs the obstacle information of the obstacle candidate, which was not determined to be a non-obstacle, as obstacle information of an obstacle to the collision determination section 41 in the vehicle control device 4 via the I/F 59.

In this manner, the obstacle determination device 5 can exclude non-obstacles from obstacle candidates detected by the peripheral detection sensor 2 and can output information on obstacles to the collision determination section 41, whereby unnecessary stop operations and brake operations can be suppressed.

The obstacle discrimination device 5 further includes the input selector switch 55b that alternatively switches the path through which the obstacle information from the front millimeter wave radar 21F or the rear millimeter wave radar 21R is inputted to the moving object determination section 51, and al so the input selection controller 55a that performs selection control of the input selector switch 55b. In a mode that the obstacle discrimination device 5 does not include the moving object determination section 51, the detection information from the front millimeter wave radar 21F or the rear millimeter wave radar 21R is inputted to the distance filter section 52.

The mining work machine-state determination section 50 accepts an input from the shift position sensor 66, and outputs, to the input selection controller 55a, a result of determination made based on the position of the shift lever as to which of forward or backward the traveling direction of the mining work machine is. The input selection controller 55a performs selection control on the input selector switch 55b so that the obstacle information from the front millimeter wave radar 21F is inputted to the moving object determination section 51 when proceeding forward. When proceeding backward, on the other hand, the input selection controller 55a performs selection control on the input selector switch 55b so that the obstacle information from the rear millimeter wave radar 21R is inputted to the moving object determination section 51.

The payload weight detecting section 42 in the vehicle control device 4 has already been provided with a payload weight table, which specifies payload weights corresponding, for example, to stroke lengths or strain quantities based on stroke lengths detected by the suspension sensor 64 arranged on a suspension (not shown) for one of the front wheels 1d or a suspension (not shown) for one of the rear wheels 1e or strain quantities detected by the strain sensor 63, such as a load cell, arranged at a predetermined position on the vehicle body 1a, calculates the weight of a payload placed in the vessel 1c, and according to the calculated payload weight, outputs payload weight information to the collision determination section 41.

The collision determination section 41 corrects the stopping distance of the dump truck 1 based on the payload weight information outputted from the payload weight detecting section 41, and has the corrected stopping distance reflected to the determination of a collision.

To the own position estimating section 43, position detection information is inputted from the GPS device 61 and IMU device 62. Based on the position detection information, the own position estimating section 43 computes the position of the mining work machine at the time of detection in a haulage area for the vehicle body 1a.

In addition, by comparing map information on a mine, in which the dump truck 1 travels, as stored in the map information storage section 46 with the computed position of the mining work machine, the own position estimating section 43 also estimates the position of the mining work machine on the map information. The map information also contains slope angle information on slope angles at various locations on the haulage area, on which the dump truck 1 travels, in the mine. The own position estimating section 43 outputs the estimated mining work machine position information to the collision determination section 41. Here, the slope angle information may also be included in the estimated mining work machine position information to be used in collision determination processing which will be described subsequently herein.

The collision determination section 41 performs collision determination processing based on a time to collision (TTC) with an obstacle located on the travel lane of the mining work machine and the travel speed V of the mining work machine, and according to the stage of the determination, performs automatic speed control and/or automatic steering control at the travel drive device 3.

Based on the obstacle information, such as the position, speed, reflection intensity, of each front obstacle detected at the obstacle discrimination device 5, the vehicle information such as the travel speed V, yaw acceleration (which is included in detection information from the IMU device 6), steering angle of a steering wheel and brake stroke acquired from the travel drive device 3 and onboard sensors 6, and the mining work machine position information from the own position estimating section 43, the collision determination section 41 first determines whether the detected obstacle exists within the travel range of the mining work machine. The collision determination section 41 then calculates a time to collision (TTC) between the mining work machine and the obstacle. Here, the time to collision (TTC) can be determined by the following formula (1).

$$\text{TTC} = \text{Distance to obstacle/relative speed to obstacle} \quad (1)$$

If the dump truck 1 is a manned dump truck, the manned dump truck may not include the own position estimating section 43. If this is the case, the travel range of the mining work machine is estimated only from vehicle information, such as travel speed V, yaw rate, steering angle of the steering wheel and brake stroke, acquired from the travel drive device 3 and onboard sensors 6, and a determination is made as to whether the detected obstacle exists within the travel range of the mining work machine.

Figure 4:
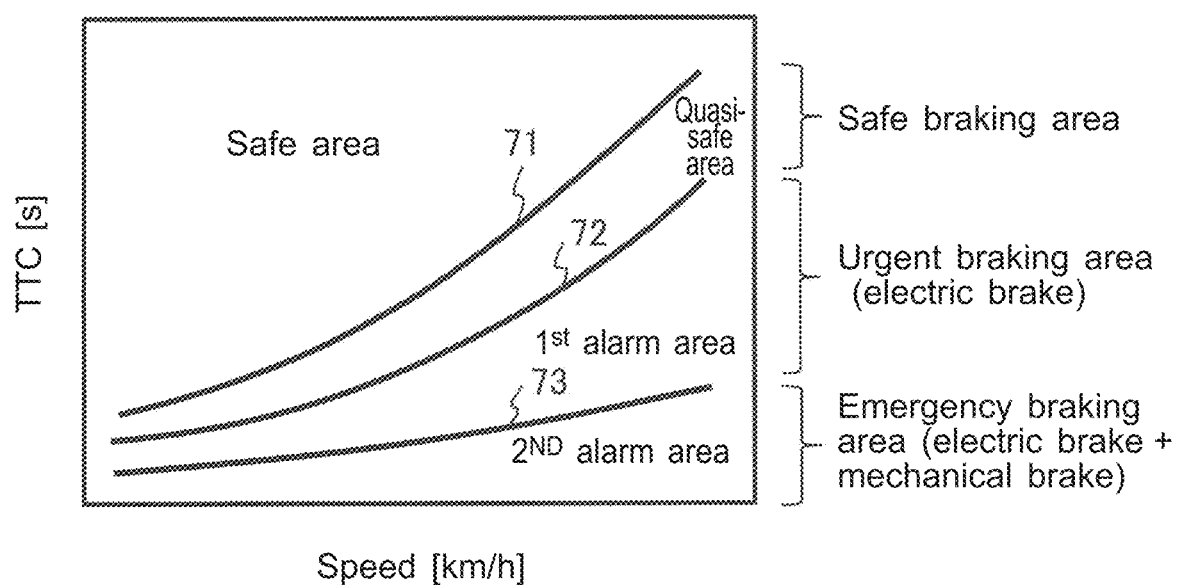
FIG. 4 is a schematic diagram depicting a relationship among time to collision (TTC), speed and alarm area with respect to a dump truck.

The collision determination section 41 next determines, from a comparison, for example, with a TTC map of the dump truck 1 as depicted in FIG. 4, whether the obstacle and the mining work machine collide. FIG. 4 is a schematic diagram depicting a relationship among the time to collision (TTC), the speed and the alarm area with respect to the dump truck. The TTC map is divided into a safe area, a quasi-safe area, a first alarm area and a second alarm area by graphs 71,72,73 each of which defines the relationship between the speed and the time to collision. The safe area and quasi-safe area are a safe braking area where a contact can be avoided by normal braking operation. The first alarm area is an urgent braking area where urgent braking using an electric brake 3a (or a retarder brake) is required. The second alarm area is an emergency braking area where emergency braking using the electric brake 3a and a mechanical brake 3b in combination is needed.

The collision determination section 41 performs collision determination processing based on the time to collision with the obstacle located on the travel lane of the mining work machine and the speed of the mining work machine, and outputs, to a steering motor 3c, drive control information for applying braking to the speed of the dump truck 1 by the electric brake 3a or the electric brake 3a and mechanical brake 3b corresponding to the relevant alarm area, and drive control information for changing the steering angle of the dump truck 1, whereby a collision with the obstacle is avoided.

The vehicle drive device 4 also includes the alarm generating section 80, and may be configured to output its determination result to the alarm generating section 80 if a collision determination result is obtained indicating that there is a need to perform avoidance operation. Upon receipt of the determination result, the alarm generating section 80 may generate collision determination information that indicates the occurrence of a need to perform avoidance operation, and may then transmit it to the control server 10 via the communication section 45. Upon receipt of the collision determination information, the control server 10 may use the information for the avoidance of a collision in traffic control processing. If the collision determination information is not transmitted to the control server 10, the alarm generating section 80 may be omitted.

If the dump truck 1 is a so-called manned dump truck that travels according to control by an operator, the alarm generation section 80 may be configured as a device that issues an alarm to notify the operator of a risk of collision by using an alarm sound, an alarm voice message, or an alarm display on a screen display device (not shown) arranged in the cab 1b.

The communication section 45 transmits own position information to the control server 10, and from the control server 10, receives haulage information on dispatch management and traffic control for autonomous travel control processing.

The vehicle control device 4 may also transmit the position information of each obstacle candidate, which the obstacle discrimination device 5 determined to be a non-obstacle, in addition to the position information of each obstacle, which the obstacle discrimination device 5 determined to be an obstacle, to the control server 10 via the communication section 45. The control server 10 (for example, a traffic control section 15 to be described subsequently herein) may store the received position information of the non-obstacle and obstacle and may refer to it upon performing traffic control or may transmit it to other vehicles.

The communication section 45 may additionally include a configuration that directly transmits the position information of the non-obstacle and obstacle and the mining work machine position information to other vehicles, in other words, that performs so-called vehicle-to-vehicle communication.

As illustrated in FIG. 2, the control server 10 includes a communication section 11 that performs transmission and reception of data with each dump truck 1, a map information storage section 12 in which map information on a mine such as a haulage area where each dump truck 1 travels has been stored beforehand, a fleet management section 13 that sets a travel-permitted zone to each dump truck 1 based on the map information stored in the map information storage section 12 and manages fleet operation, a dispatch management section 14 that performs dispatch management processing such as setting a destination for the dump truck 1 and determining its travel route, and the traffic control section 15 that controls the traffic of all vehicles which are traveling in the mine.

To the fleet management section 13, the communication section 11, map information storage section 12, dispatch management section 14 and traffic control section 15 are all connected. Based on the map information stored in the map information storage section 12, dispatch management information outputted from the dispatch management section 14 and traffic control information outputted from the traffic control section 15, the fleet management section 13 prepares fleet management data for each dump truck 1 or the like in comparison with predetermined fleet patterns or the like. The fleet management data include, for example, destination information and travel route information for each dump truck 1, and information indicating a travel-permitted zone which is a partial zone on the travel route and is a zone with a travel permission granted to the dump truck 1 only. Based on the fleet management information, the fleet management section 13 generates haulage information including data to be referred to when each dump truck 1 travels autonomously.

The communication section 11 then wirelessly transmits the haulage information to each dump truck 1. In each dump truck 1, the onboard navigator 44, with reference to the map information in the map information storage section 46, generates drive control information which is required to perform autonomous travel in accordance with the haulage information, and outputs the drive control information to the drive control device 3. In the manner as described above, each dump truck 1 autonomously travels in accordance with instructions from the control server 10.

The control server 10, vehicle control device 4 and obstacle discrimination device 5 are configured by hardware including, in addition to a computing and control device such as a central processing unit (CPU), storage devices such as a read only memory (ROM) and a hard disk drive (HDD), and a random access memory (RAM) that serves as a work area when the CPU executes programs. This hardware executes software that specifies processing to be performed at the control server 10, vehicle control device 4 and obstacle discrimination device 5, whereby the functions of the control server 10, vehicle control device 4 and obstacle discrimination device 5 are realized.

In the case of a manned dump truck, on the other hand, the manned dump truck may not include the mining work machine position, which is determined based on information from the onboard sensor 6 and travel drive device 3, the map information on the mine, in which the dump truck 1 travels, as stored beforehand in the onboard navigator 44, and the like. If this is the case, the collision determination section 41 may determine a risk of collision with each obstacle by estimating the traveling direction of the mining work machine from the yaw rate, the steering angle of the front wheel 1d, and the like.

One example of detection data by the front millimeter wave radar 21 and rear millimeter wave radar 21R is presented in FIG. 5.

As illustrated in FIG. 5, in the detection data from the front millimeter wave radar 21F and rear millimeter wave radar 21R, for every identification information (for example, ID=1, ID=2, . . . , ID-n) for uniquely identifying each detected obstacle candidate, the clock times at which reflected waves were received from the corresponding obstacle candidate, the distances Lfi from the mining work machine, the angles at which the reflected waves were received, the relative speeds and the reflection intensities (reception intensities) of the reflected waves, all at those clock times, are correlated.

As a vehicle has relatively high reflection intensity, the reception of a reflected wave from the vehicle makes it possible to detect the vehicle even if the vehicle is at a distant position. On the other hand, a non-vehicle (road surface) has relatively low reflection intensity so that there is a tendency to detect a road surface at positions close to the mining work machine. In the example of FIG. 5, ID=1 begins to be detected from a point where the relative distance to the mining work machine is 45 m, and further its reflection intensity is not very high. ID=2, on the other hand, begins to be detected from a point where the relative distance to the mining work machine is 80 m, and further its reflection intensity is relatively high. Accordingly, the obstacle candidate labeled by ID=1 has a high possibility of being a non-vehicle (road surface), and the obstacle candidate labeled by ID=2 is estimated to be a vehicle.

It is one of characteristic features of this embodiment that, if vehicles and non-vehicles (for example, road surfaces) are included in obstacle candidates outputted from the front millimeter wave radar 21F and rear millimeter wave radar 21R, every non-vehicle (road surface) is excluded from the obstacle candidates based on the above-described characteristic of reflected waves.

Figure 6:
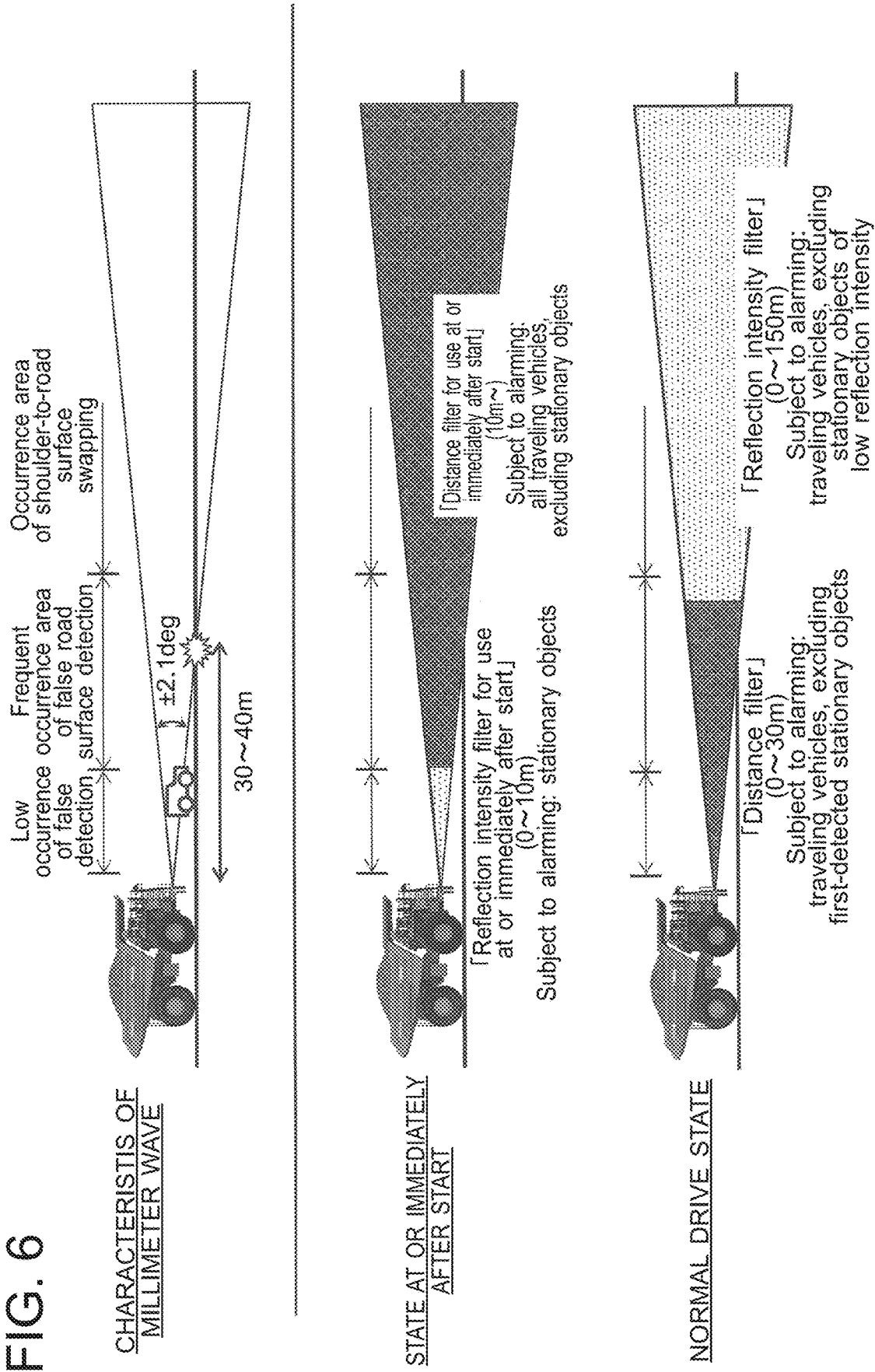
FIG. 6 is an explanatory diagram of an outline of obstacle discrimination processing (as viewed in side elevation).
Figure 7:
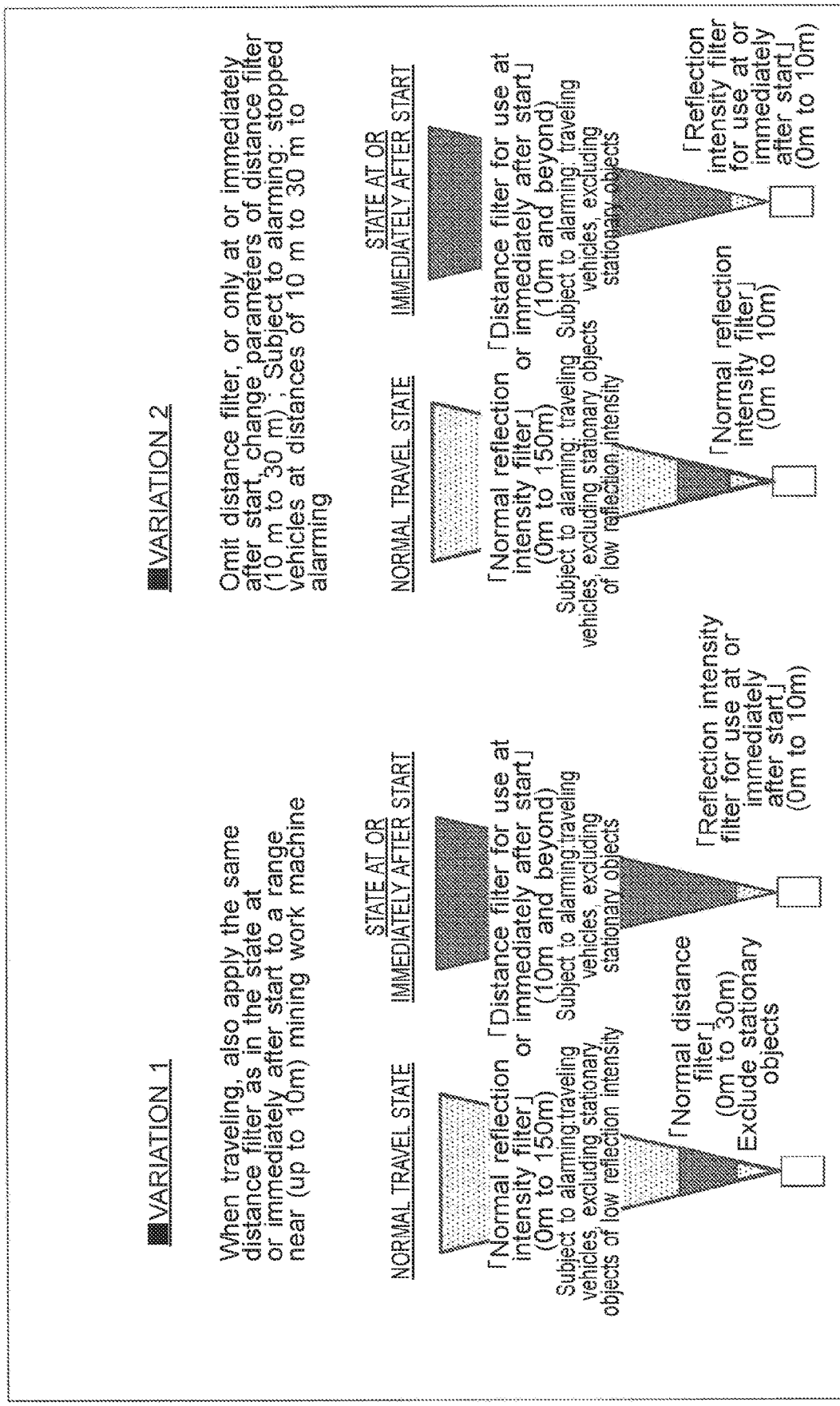
FIG. 7 is an explanatory diagram of outlines of obstacle discrimination processing (as viewed in plan).

With reference to FIGS. 6 and 7, a description will be made about outlines of obstacle discrimination processing in this embodiment. FIG. 6 is an explanatory diagram of an outline of obstacle discrimination processing (as viewed in side elevation). FIG. 7 is an explanatory diagram of outlines of obstacle discrimination processing (as viewed in plan).

As illustrated in FIG. 6, the front millimeter wave radar 21F radiates a millimeter wave, with a spread in a vertical direction, centering along the central axis of the millimeter wave radar. In the example of FIG. 6, the millimeter wave is illustrated as having an angle of ±2.1° upwards and downwards with respect to the horizontal direction, although this numerical value is merely illustrative. In this case, the millimeter wave is radiated to a road surface near 30 to 40 m ahead of the dump truck 1 as a datum point in the traveling direction. As a result, in the area to a point where the millimeter wave is radiated from the dump truck 1 to the road surface, the road surface is not detected at all so that false detection between the road surface and vehicles hardly occurs there. In an area approximately 30 to 40 m ahead of the dump truck 1 in the traveling direction, false detection of the road surface occurs frequently. Further, in an area farther than 30 to 40 m ahead of the dump truck 1 in the traveling direction, swapping from the shoulder to the road surface tends to occur. This applies equally to the rear millimeter wave radar 21R.

On the other hand, in the state at or immediately after the start including both the state in which the dump truck 1 is in the stopped state and the state immediately after the start in which the dump truck 1 is gradually accelerated from the stop, obstacles that exist in a dead angle from the cab 1b of the dump truck 1 are desirably detected with still high accuracy, while obstacles at distant points may still remain undetected. As the speed of the dump truck 1 increases, a need arises to ensure meeting a braking distance, leading to a heightened desire for the detection of distant obstacles at the earliest possible timing.

In this embodiment, in view of the characteristics of millimeter wave radars and the desires concerning the detection of obstacles during traveling of the dump truck 1, a reflection intensity filter and a distance filter are hence used by switching them depending on the travel state. Described more specifically, as illustrated in FIGS. 6 and 7, stationary objects are detected, as objects to be subjected to alarming, by using the reflection intensity filter in a vicinity (for example, 0 m to 10 m) of the dump truck in the state at or immediately after the start, and in a distant area (for example, 10 m and farther), on the other hand, stationary objects are excluded by using the distance filter and traveling vehicles are all subjected to alarming.

Further, in order to detect traveling vehicles while suppressing false detection of the road surface in the normal travel state, the distance filter is used at a medium distance (for example, up to 30 m or so) from the dump truck 1 to exclude a first-detected stationary object (which is highly likely to be the road surface), so that traveling vehicles are subjected to alarming. In a distant area, on the other hand, the reflection intensity filter is used to exclude stationary objects of low reflection intensity, so that traveling vehicles are subjected to alarming.

Figure 8:
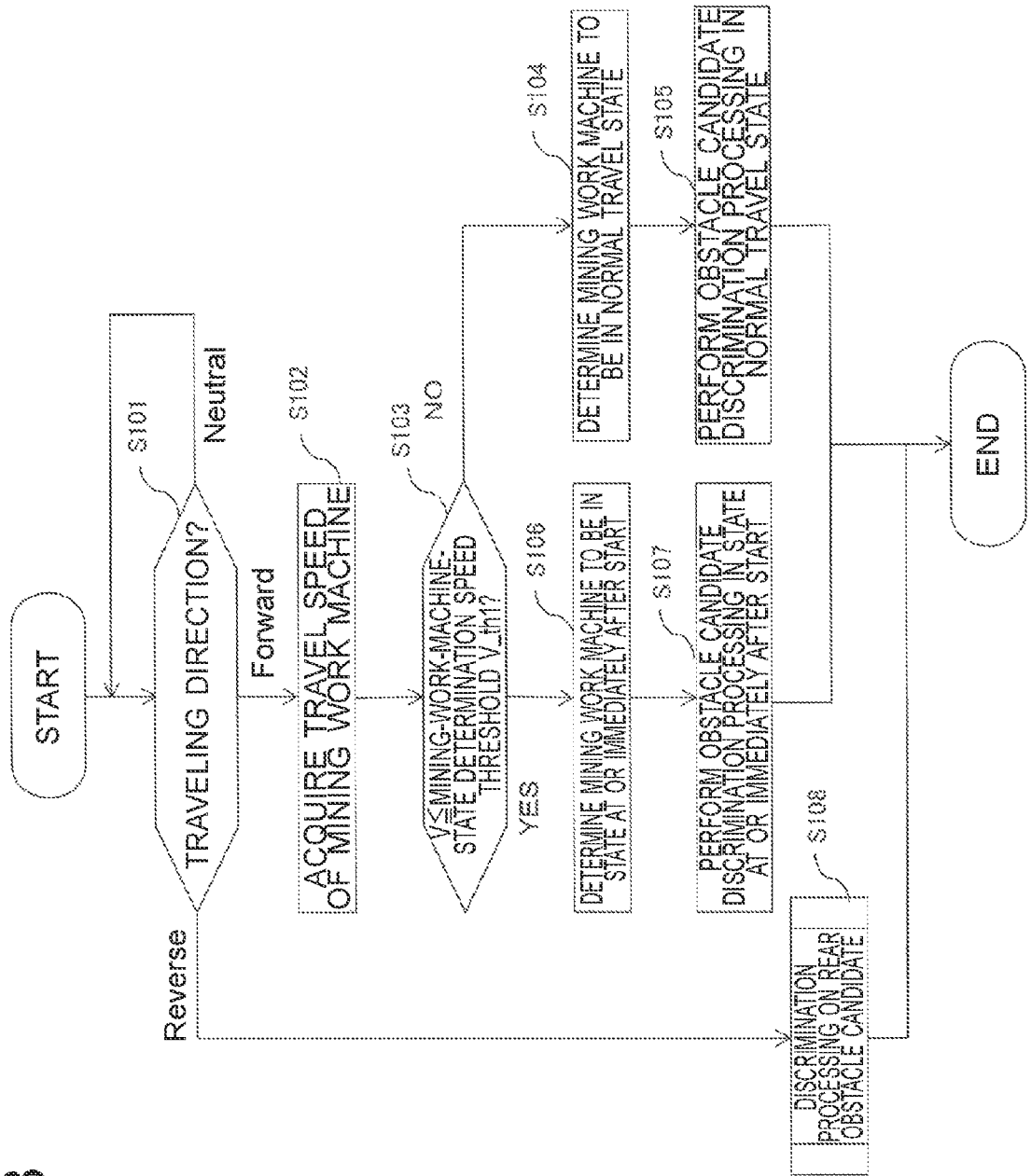
FIG. 8 is a flow chart illustrating a flow of obstacle candidate discrimination processing in this embodiment.
Figure 9:
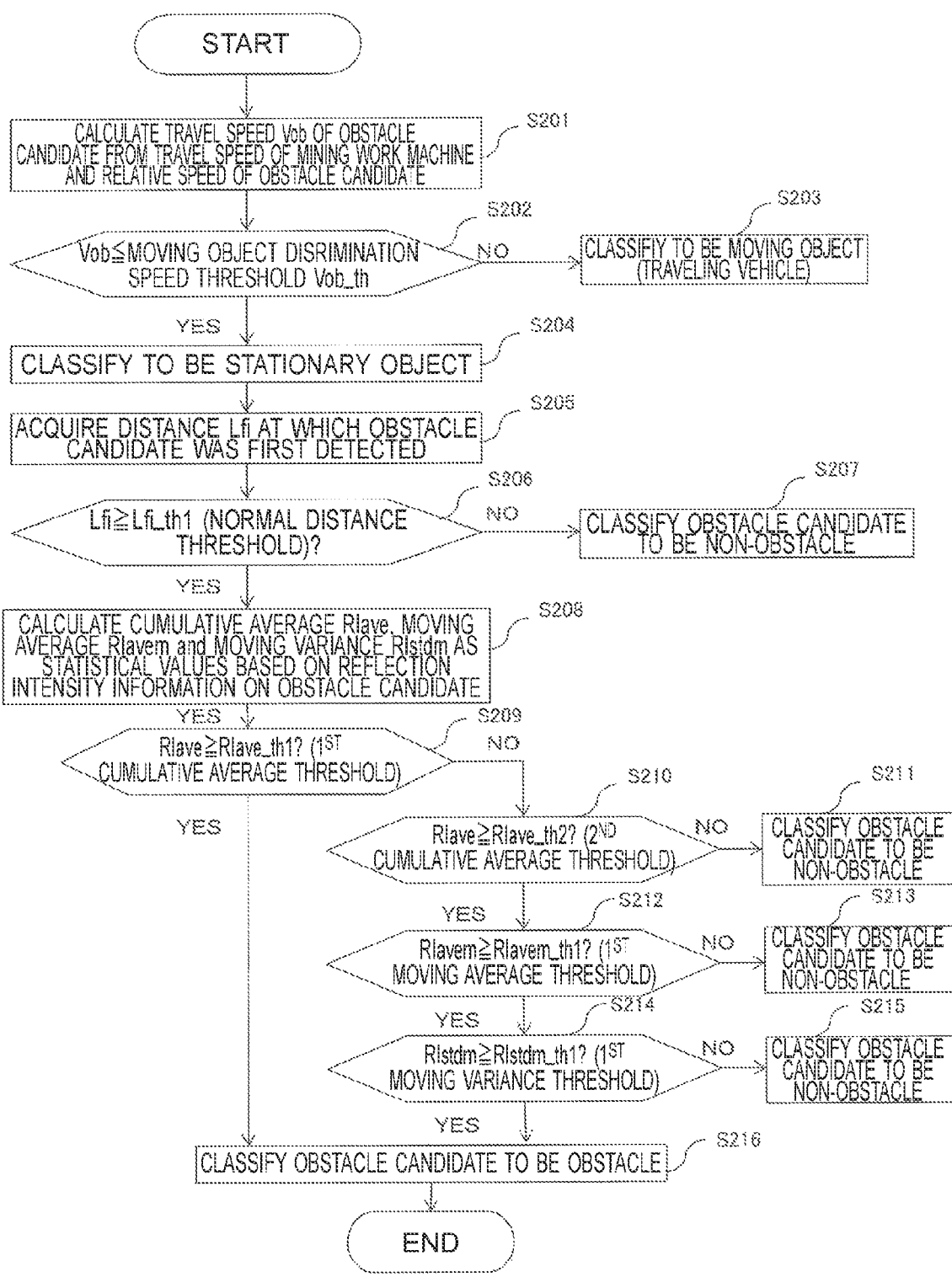
FIG. 9 is a flow chart illustrating a flow of Example 1 of obstacle candidate discrimination processing in a normal travel state.
Figure 10:
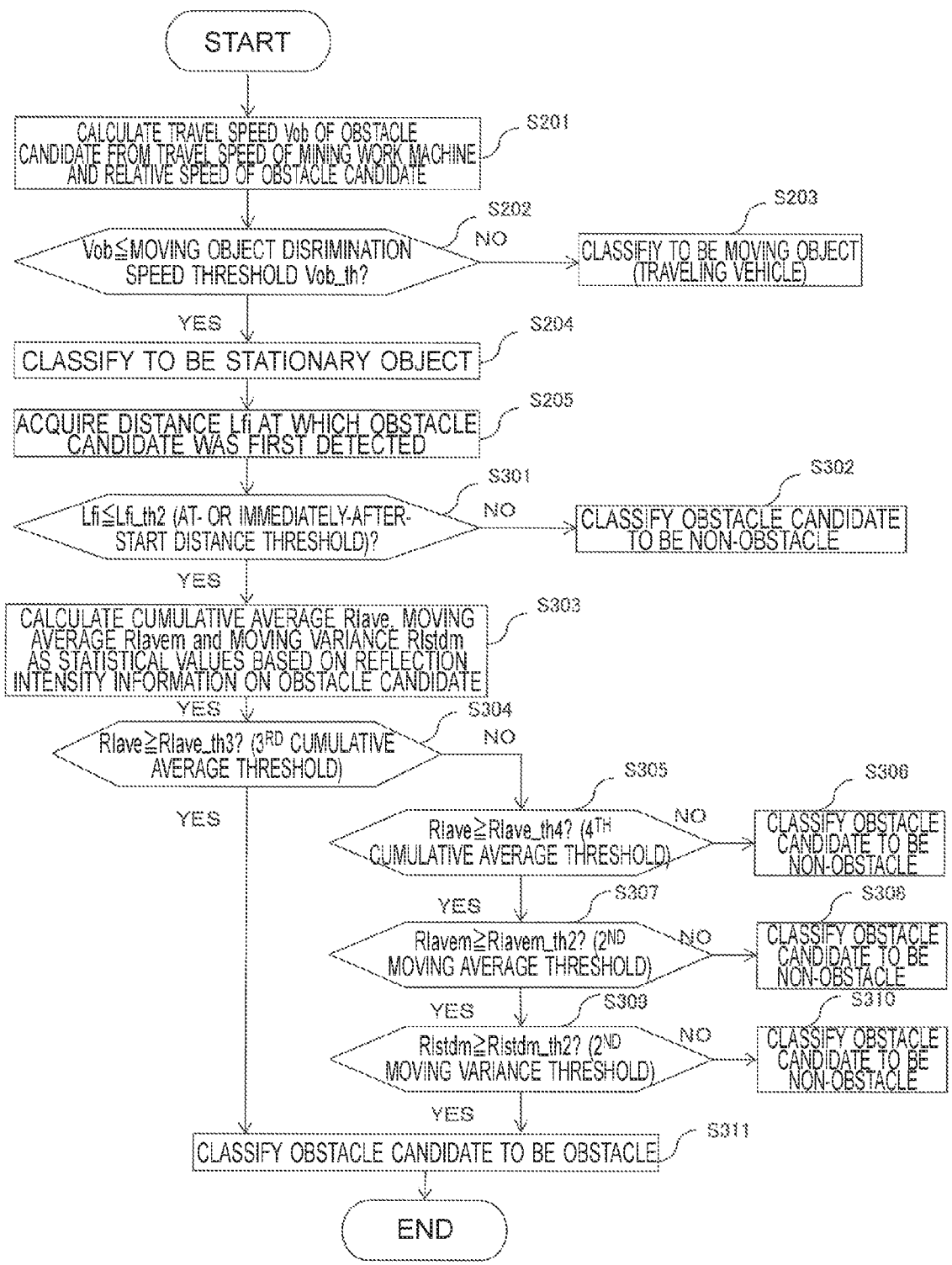
FIG. 10 is a flow chart illustrating a flow of Example 1 of obstacle candidate discrimination processing in a state at or immediately after a start.
Figure 11:
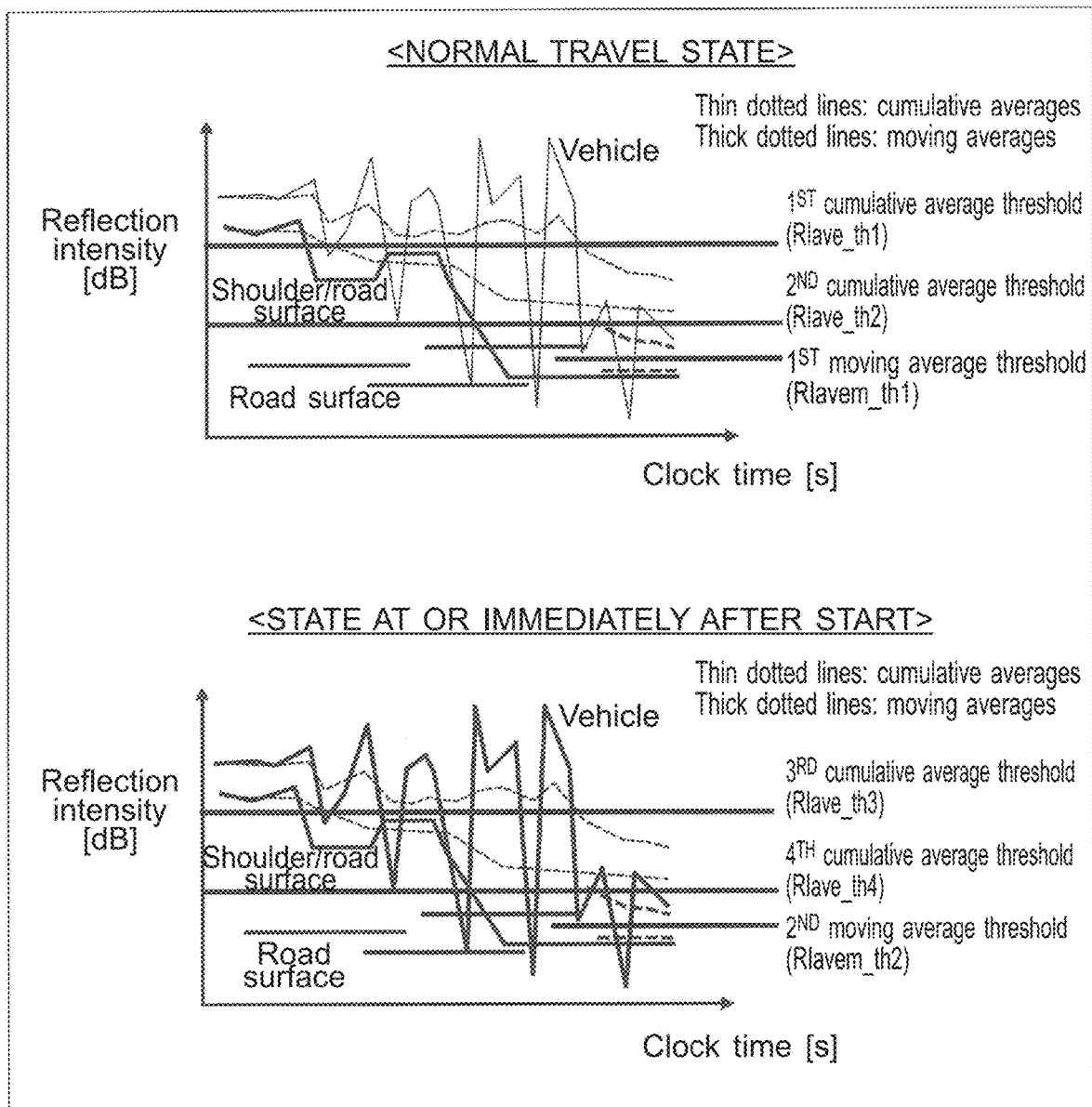
FIG. 11 is a diagram illustrating relationships between respective reflection intensities from a vehicle, a road surface/shoulder and a road surface and cumulative average thresholds.

With reference to FIGS. 8 to 11, a description will hereinafter be made about one example of a method of classifying a road surface, which is a non-vehicle, as a non-obstacle. FIG. 8 is a flow chart illustrating a flow of obstacle candidate discrimination processing in this embodiment. FIG. 9 is a flowchart illustrating a flow of Example 1 of obstacle candidate discrimination processing in a normal travel state. FIG. 10 is a flow chart illustrating a flow of Example 1 of obstacle candidate discrimination processing in a state at or immediately after a start. FIG. 11 is a diagram illustrating relationships between respective reflection intensities from a vehicle, a road surface/shoulder and a road surface and cumulative average thresholds. A description will hereinafter be made in the order of steps in FIG. 8.

The mining work machine-state determination section 50 determines the traveling direction of the mining work machine based on an output from the shift position sensor 66 (S101). If the shift lever has been placed in forward (L, 2, 3 or 4) (S101/forward), a discrimination processing of each front obstacle candidate is performed based on an input from the front millimeter wave radar 21F (S102 onwards). On the other hand, if the shift lever has been placed in reverse (S101/reverse), a discrimination processing of each rear obstacle candidate is performed based on an input from the rear millimeter wave radar 21R (S108). If the shift lever has been placed in neutral (S101/neutral), no discrimination processing is performed on any obstacle candidates, and the processing procedures are on standby. The discrimination processing of the front obstacle candidate and that of the rear obstacle candidate follow the same in processing procedures, but various thresholds to be used may be made different between the former processing and the latter processing because the processing procedures are generally faster during proceeding forward than during proceeding backward. A description will hereinafter be made about the discrimination processing of each front obstacle candidate, and the flow of the discrimination processing of each rear obstacle candidate is similar.

The mining work machine-state determination section 50 acquires the travel speed V of the mining work machine from the speed sensor 65 (S102).

Example 1 of Travel State Determination Processing

The mining work machine-state determination section 50 determines whether the travel speed V of the mining work machine is equal to or lower than a mining work machine-state determination speed threshold $V\_th1$ set to determine the travel state of the mining work machine, and if negative (S103/NO), determines that the mining work machine is in a normal travel state (S104) and classifies each obstacle candidate based on the obstacle candidate discrimination processing for the normal travel state (S105). If affirmative (S103/YES), on the other hand, the mining work machine-state determination section 50 determines that the mining work machine is in a state at or immediately after the start (S106), and classifies each obstacle candidate based on obstacle candidate discrimination processing for the state at or immediately after the start (S107).

Example 1 of Obstacle Candidate Discrimination Processing in Normal Travel State Example 1 of the obstacle candidate discrimination processing in the normal travel state is illustrated in FIG. 9. The moving object determination section 51 calculates the travel speed Vob of the obstacle candidate based on the travel speed V of the mining work machine as acquired from the speed sensor 65 and the relative speed of the obstacle candidate as acquired from the front millimeter wave radar 21F (S201).

The moving object determination section 51 determines whether the travel speed Vob of the obstacle candidate is equal to or lower than a moving object discrimination speed threshold $Vob\_th$ set beforehand to distinguish a moving object (for example, a traveling vehicle) and a stationary object, and if negative (S202/NO), classifies the obstacle candidate to be a moving object (traveling vehicle) and performs subsequent processing. If affirmative (S202/YES), on the other hand, the moving object determination section 51 classifies the obstacle candidate to be a stationary object (S204), outputs the classification result to the collision determination section 41, and performs subsequent processing.

The distance filter section 52 acquires the distance Lfi where the obstacle candidate classified to be the stationary object was first detected (S205). In the case of ID=1 in FIG. 5, for example, the distance Lfi corresponds to the distance of 45 m where ID=1 was first detected. The distance filter section 52 determines whether the distance Lfi is equal to or greater than the normal distance threshold $Lfi\_th1$ set beforehand to distinguish a vehicle and a non-vehicle (road surface), and if negative (S206/NO), classifies the obstacle candidate to be a non-obstacle (S207). If affirmative (S206/YES), on the other hand, the reflection intensity filter section 53 calculates statistical values based on the reflection intensity information of the obstacle candidate, specifically the cumulative average RIave, moving average RIavem, and moving variance RIstdm (S208).

The reflection intensity filter section 53 calculates the cumulative average RIave, moving average RIavem and moving variance RIstdm of the reflection intensities from the obstacle candidate and, if the cumulative average RIave of the reflection intensities is equal to or greater than the first cumulative average threshold $RIave\_th1$ (S209/YES) or if the cumulative average RIave of the reflection intensities is equal to or greater than a second cumulative average threshold $RIave\_th2$ and is smaller than the first cumulative average threshold $RIave\_th1$ (S209/NO, S210/YES), the moving average RIavem of the reflection intensities is equal to or greater than a first moving average threshold $RIavem\_th1$ (S212/YES), and the moving variance RIstdm of the reflection intensities is equal to or greater than a first moving variance threshold $RIstdm\_th1$ (S214/YES), classifies the obstacle candidate as an obstacle (S216), and otherwise classifies the obstacle candidate as a non-obstacle (S211,S213,S215). The first cumulative average threshold $RIave\_th1$, second cumulative average threshold $RIave\_th2$, first moving average threshold $RIavem\_th1$ and first moving variance threshold $RIstdm\_th1$ each correspond to the normal reflection intensity threshold.

According to this modification, each obstacle candidate which has a relatively high reflection intensity like vehicles is classified as an obstacle irrespective of whether the mining work machine is in a travel state or in a state at or immediately after a start. By performing a determination of each remaining obstacle candidate based on the cumulative average RIave and moving average RIavem, effects of a shoulder or vehicle detected at a distant point can be excluded so that points on a near road surface can be classified with still higher accuracy to be non-obstacles.

Example 1 of Obstacle Candidate Discrimination Processing in State at or Immediately after Start Referring to FIG. 10, a description will be made about Example 1 of obstacle candidate discrimination processing in a state at or immediately after a start. Similar to the above-described case in which the mining work machine was determined to be in the normal travel state, obstacles and non-obstacles can also be distinguished in the state at or immediately after the start. When changing from the state at or immediately after the start to the normal travel state, the information of each obstacle detected in the detection processing in the state at or immediately after the start is held. If a risk of contact, collision or the like is determined to exist during normal traveling, an avoidance of collision is attempted by an alarm or an automatic brake.

The distance filter (low-speed distance filter) in the state at or immediately after the start performs reflection intensity filtering processing on each obstacle candidate if as illustrated in FIG. 10, the distance Lfi at which the stationary object was first detected is equal to or smaller than the start distance threshold $Lfi\_th2$ (S301/YES), but as illustrated in FIG. 9, the distance filter (high-speed distance filter) in the normal travel state performs reflection intensity filtering processing on each obstacle candidate if the distance Lfi at which the stationary obstacle was first detected is equal to or greater than the normal distance threshold $Lfi\_th1$ (S206/YES). Depending on the magnitude relationship between the two thresholds, differences may arise at or immediately after a start as will be described below.

$$Lfi\_th2 < Lfi\_th1 \tag{1}$$

Stationary objects in a distance range of Lfi_th2 to Lfi_th1 at or immediately after the start are all classified as non-obstacles by the distance filter.

$$Lfi\_th2 = Lfi\_th1 \qquad (2)$$

At or immediately after the start, there is no area in which stationary objects are all classified as non-obstacles by the distance filter.

$$Lfi\_th2 > Lfi\_th1 \qquad (3)$$

Stationary objects in a distance range of Lfi_th1 to Lfi_th2 at or immediately after the start are subjected to distance filtering processing by detection processing in both the state at or immediately after the start and the normal drive state.

If the distance Lfi at which the stationary obstacle was first detected in the state at or immediately after the start is equal to or smaller than the start distance threshold Lfi_th2 (S301/YES), the reflection intensity filter section 53 calculates statistical values, such as the cumulative average RIave, of the reflection intensities from the obstacle candidate. If the cumulative average RIave of the reflection intensities is equal to or greater than a third cumulative average threshold RIave_th3 (S304/YES) or if the cumulative average RIave of the reflection intensities is equal to or greater than a fourth cumulative average threshold RIave_th4 and is smaller than a third cumulative average threshold RIave_th3 (S304/NO, S305/YES), the moving average RIavem of the reflection intensities is equal to or greater than a second moving average threshold RIavem_th2 (S307/YES), and the moving variance RIstdm of the reflection intensities is equal to or greater than a second moving variance threshold RIstdm_th2 (S309/YES), the reflection intensity filter section 53 classifies the obstacle candidate as an obstacle (S311), and otherwise classifies the obstacle candidate as a non-obstacle (S306, S308, S310). The third cumulative average threshold RIave_th3, fourth cumulative average threshold RIave_th4, second moving average threshold RIavem_th2 and second moving variance threshold RIstdm_th2 each correspond to the reflection intensity threshold at or immediately after the start.

If different determinations are made on the same obstacle candidate in the state at or immediately after the start and the normal drive state, there are three possible ways of dealing with the situation, which include: the obstacle candidate is handled as an obstacle in both the state at or immediately after the start and the normal drive state if the obstacle candidate is classified as an obstacle in one of the state at or immediately after the start and the normal drive state; priority is given to the determination in either the state at or immediately after the start or the normal drive state; and the obstacle candidate is classified to be a non-obstacle if both the determinations do not agree.

As illustrated in FIG. 11, by setting the first cumulative average threshold RIave_th1 and the third cumulative average threshold RIave_th3 at values in the normal drive state and the state at or immediately after the start, respectively, so that obstacle candidates can be classified into those having high reflection intensity, like vehicles, and those having low reflection intensity, such as road surfaces, the former obstacle candidates and the latter obstacle candidates can be distinguished based on comparisons between the cumulative averages RIave and first cumulative average thresholds RIave_th1 or third cumulative average thresholds RIave_th3 of the reflection intensities from the individual obstacle candidates.

Further, by setting the second cumulative average threshold RIave_th2 (<the first cumulative average threshold RIave_th1) and the fourth cumulative average threshold RIave_th4 (<the third cumulative average threshold RIave_th3) at values in the normal drive state and the state at or immediately after the start, respectively, so that obstacle candidates can be classified into those including reflecting objects having higher reflection intensity than road surfaces, for example, shoulders and those including no such reflecting objects, those having reflection intensities close to those of road surfaces can be distinguished. Especially by using the first moving average threshold RIavem_th1 in the normal drive state and the second moving average threshold RIavem_th2 in the state at or immediately after the start, statistical values of each obstacle candidate are calculated using only data in a period of time preceding from the time of its detection so that effects of swapping from shoulders to road surfaces can be excluded and reflection intensities from road surfaces can be classified with still higher accuracy.

In the above-described example, the number of pieces of data to be processed at each filter can be decreased by performing processing at the distance filter section 52 and reflection intensity filter section 53 after the moving object determination section 51 has sifted moving objects (for example, traveling vehicles) as obstacles to decrease the number of obstacle candidates. In particular, the reflection intensity filter section 53 handles statistical values based on past data and the like, and therefore its processing load is relatively heavy. The processing load can, therefore, be reduced by decreasing the number of obstacle candidates to be processed at the reflection intensity filter section 53.

In addition, the use of the moving variance RIstdm makes it possible to distinguish those having large variance in reflection intensities, like vehicles, and those having small variance in reflection intensities, like shoulders and road surfaces.

During normal traveling, the braking distance of the mining work machine also becomes long, so that the classification processing into obstacles or non-obstacles needs to be also performed on stationary obstacle candidates existing in a distant area. In a stopped state before a start or during proceeding forward at low speed immediately after a start, on the other hand, it is necessary to detect only obstacle candidates near the mining work machine, the obstacle candidates having a possibility of a contact or collision at or immediately after the start. According to the above-described obstacle candidate discrimination processing, only stationary obstacle candidates which exist at positions closer than the distance threshold for the distance filter section 52 are subjected to the subsequent processing, and the possibility of false detection can be suppressed accordingly.

As described above, the obstacle candidate discrimination processing includes the travel state determination processing of the mining work machine, the obstacle candidate discrimination processing in the normal travel state, and the obstacle candidate discrimination processing in the state at or immediately after the start. These different kinds of processing each include various modified modes. A description will hereinafter be made about modifications of the different kinds of processing.

Example 2 of Travel State Determination Processing

Figure 12:
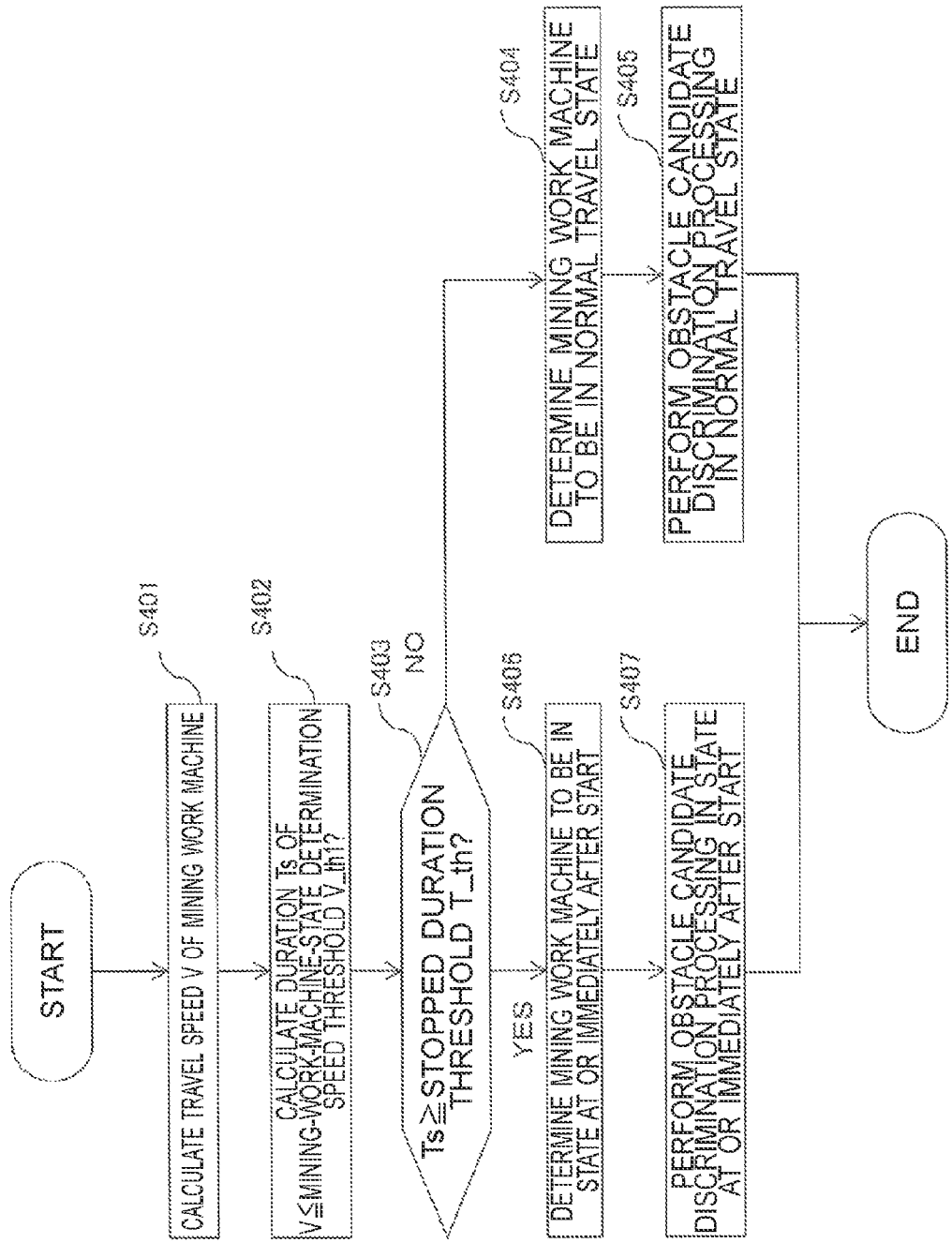
FIG. 12 is a flow chart illustrating a flow of Example 2 of obstacle candidate discrimination processing.

Referring to FIG. 12, a description will be made about Example 2 of the travel state determination processing. FIG. 12 is a flowchart illustrating a flow of Example 2 of the obstacle candidate determination processing.

The mining work machine-state determination section 50 calculates the travel speed V of the mining work machine based on the travel speed V of the mining work machine as acquired from the speed sensor 65 and information on the traveling direction of the mining work machine as acquired from the shift position sensor 66 (S401).

The mining work machine-state determination section 50 calculates, with the timer 54, a duration Ts in which the travel speed V of the mining work machine is equal to or lower than the mining work machine-state determination speed threshold V_th1 (S402), determines whether the duration Ts is equal to or longer than the stopped time threshold T_th and if negative (S403/N0), determines that the mining work machine is in the normal travel state (S404), and subsequently, performs the obstacle candidate discrimination processing in the normal travel state (S405).

If affirmative (S403/YES), on the other hand, the mining work machine-state determination section 50 determines that the mining work machine is in the state at or immediately after the start (S406), and subsequently, performs the obstacle candidate discrimination processing in the state at or immediately after the start (S407).

According to this modification, the travel state is determined based on the duration Ts after the travel speed V of the mining work machine has decreased to the mining work machine-state determination speed threshold V_th1 or lower, whereby false determination of a momentary speed reduction as a state at or immediately after a start can be avoided.

Example 3 of Travel State Determination Processing

Figure 13:
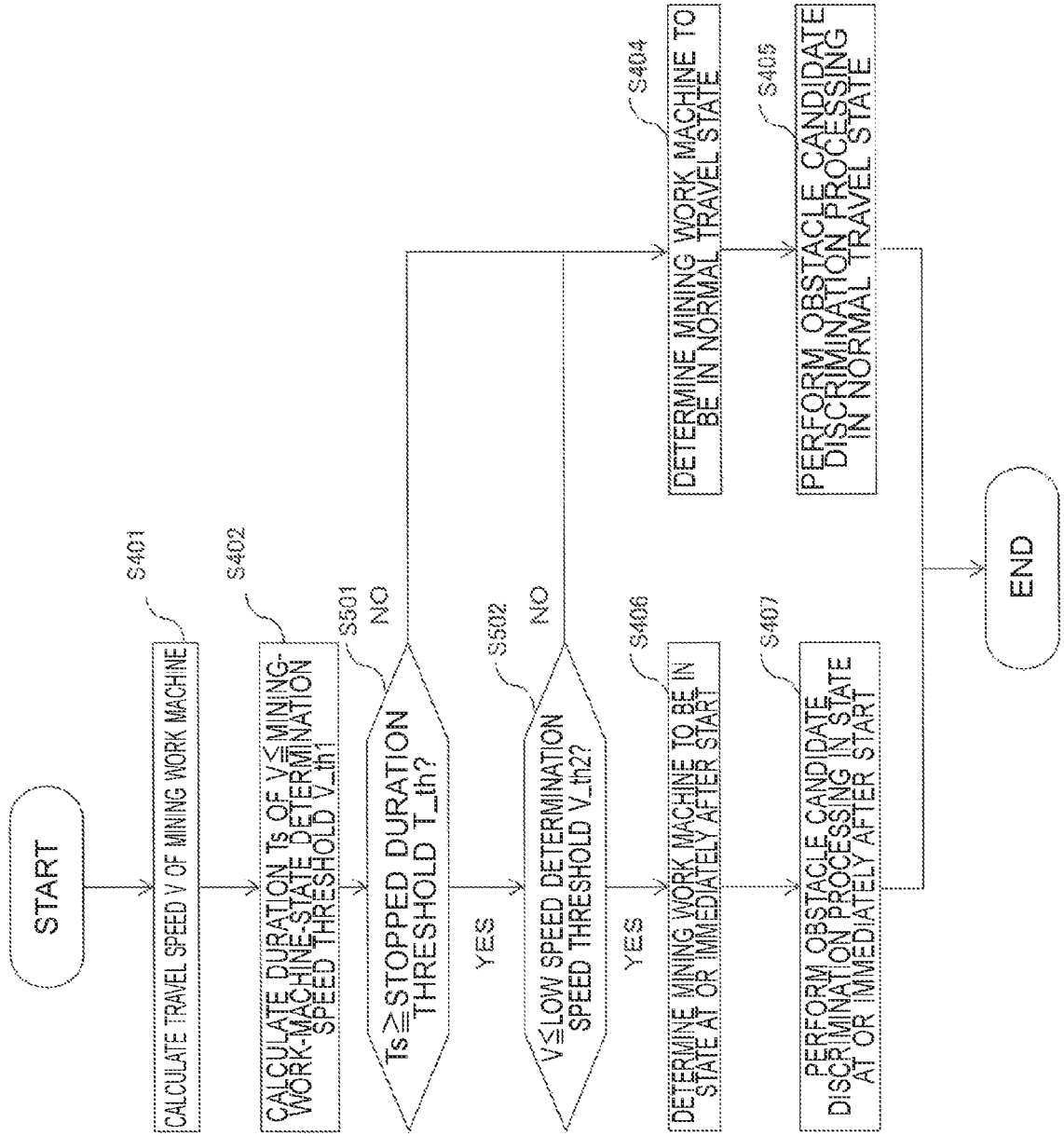
FIG. 13 is a flow chart illustrating a flow of Example 3 of obstacle candidate discrimination processing.

Referring to FIG. 13, a description will be made about Example 3 of the travel state determination processing. FIG. 13 is a flowchart illustrating a flow of Example 3 of the obstacle candidate determination processing.

In this modification, following step S402 in FIG. 12, the mining work machine-state determination section 50 determines whether the duration Ts is equal to or longer than the stopped duration threshold T_th (S501), and if negative (S501/N0), determines that the mining work machine is in a normal travel state (S404), and performs the subsequent processing (S405). The stopped duration threshold T_th may be the same as or different from the stopped duration threshold T_th used in step S403.

If affirmative (S501/YES), on the other hand, the mining work machine-state determination section 50 further compares the travel speed V of the mining work machine with a low speed determination speed threshold V_th2 (V_th2<V_th1), and if negative (S502/N0), determines that the mining work machine is in the normal travel state (S404), or if affirmative (S502/YES), determines that the mining work machine is in the state at or immediately after the start (S406), and similar to the first embodiment, subsequently performs the obstacle candidate discrimination processing in the state at or immediately after the start as in the first embodiment (S407).

According to this modification, if the travel speed V of the mining work machine has remained at the mining work machine-state determination speed threshold V_th1 or lower for the duration Ts and the mining work machine is in an extremely low speed state at the beginning of travel, the mining work machine is determined to be in the state at or immediately after the start. Only a state (low speed travel state) at the beginning of travel, in which substantially no travel distance has occurred, is thus determined to be the state at or immediately after the start, whereby obstacle candidate discrimination processing suited for the situation can be selected.

Example 4 of Travel State Determination Processing

Figure 14:
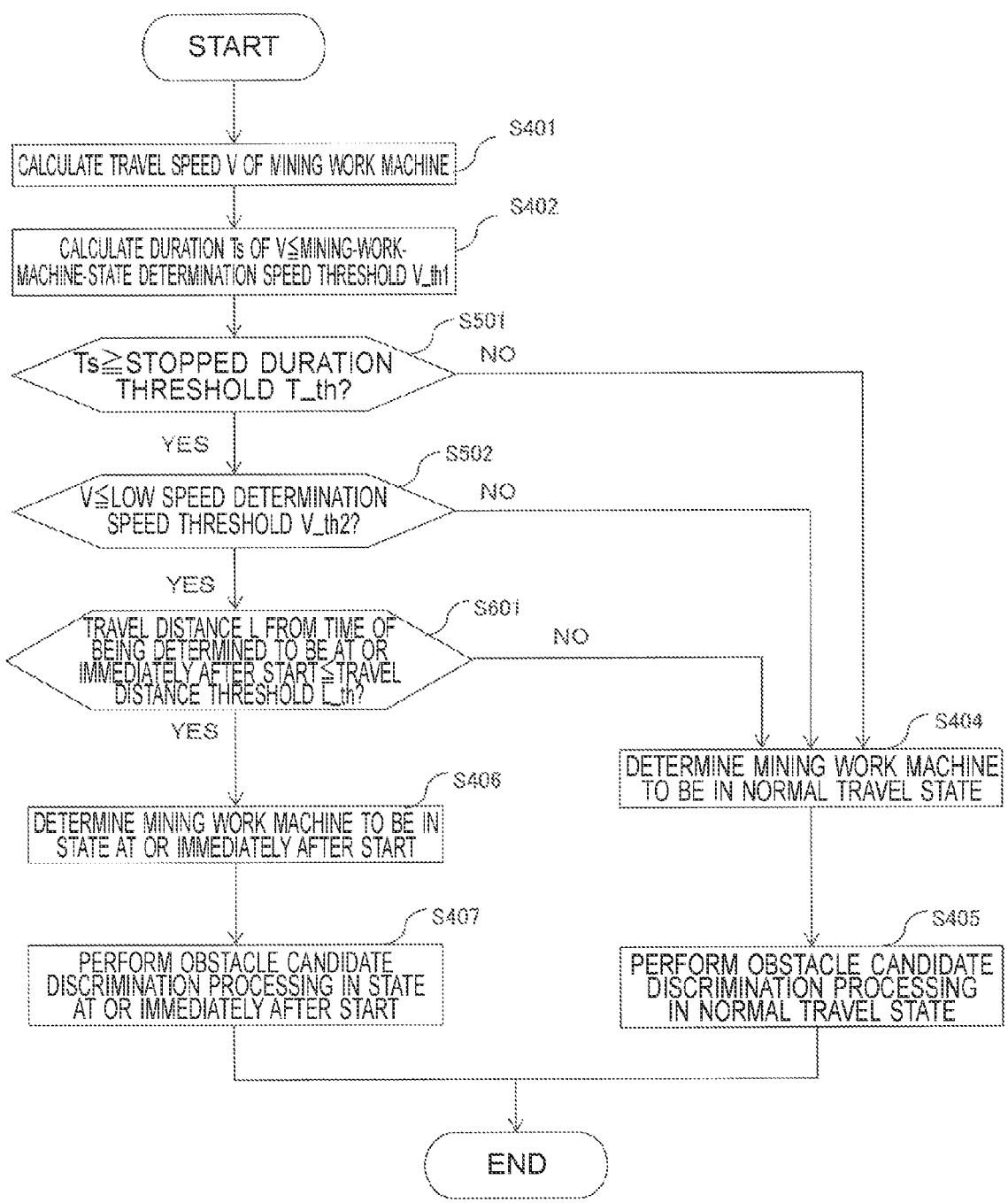
FIG. 14 is a flow chart illustrating a flow of Example 4 of obstacle candidate discrimination processing.

Referring to FIG. 14, a description will be made about Example 4 of the travel state determination processing. FIG. 14 is a flowchart illustrating a flow of Example 4 of the obstacle candidate determination processing.

In this modification, following step S502 in Example 3 of the travel state determination processing, a determination is made as to whether a travel distance L from a time point determined to be immediately after a start is equal to a travel distance threshold L_th or shorter (S601). If negative (S601/N0), the mining work machine is determined to be in a normal travel state. If affirmative (S601/YES), on the other hand, the mining work machine is determined to be in the state at or immediately after the start (S406).

According to this modification, based on whether the travel speed V of the mining work machine has remained at the mining work machine-state determination speed threshold V_th1 or lower for the duration Ts and also based on the travel distance L of the mining work machine in an extremely low speed state at the beginning of travel, a determination is made as to whether the mining work machine is in the state at or immediately after the start. Only a state at the beginning of travel, in which substantially no travel distance has occurred, is thus determined to be the state at or immediately after the start, whereby obstacle candidate discrimination processing suited for the situation can be selected.

Figure 15:
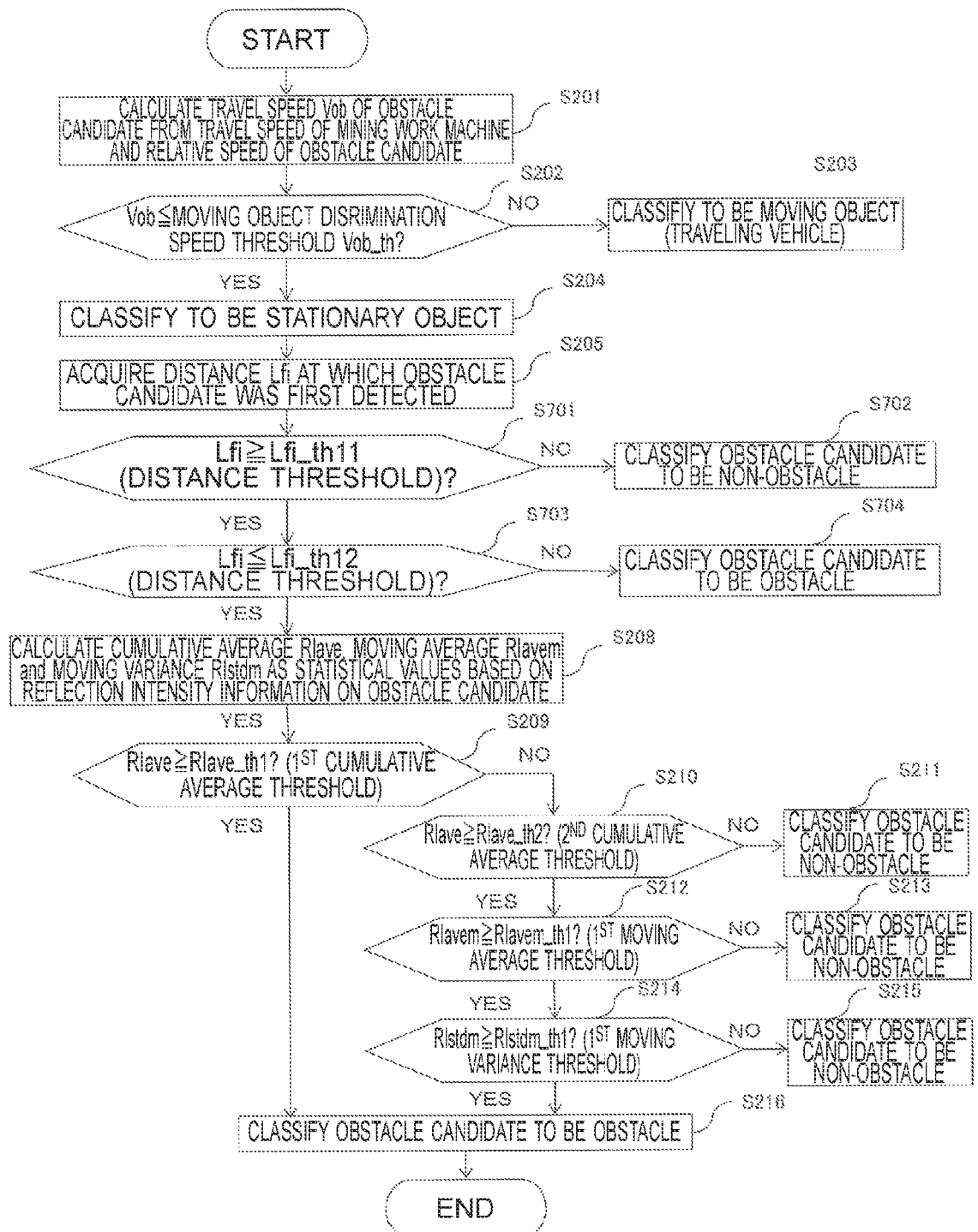
FIG. 15 is a flow chart illustrating a flow of Example 2 of obstacle candidate discrimination processing in a normal travel state.

Example 2 of Obstacle Candidate Discrimination Processing in Normal Travel State Referring to FIG. 15, a description will be made about Example 2 of the obstacle candidate discrimination processing in a normal travel state. FIG. 15 is a flow chart illustrating a flow of Example 2 of obstacle candidate discrimination processing in a normal travel state.

A determination that distinguishes an obstacle and a non-obstacle in the normal travel state is performed, for example, as illustrated in FIG. 15. Subsequent to step S205 of the obstacle candidate discrimination processing in the normal travel state as illustrated in FIG. 9, a determination is made as to whether the distance Lfi is equal to or greater than a first distance threshold Lfi_th11 set beforehand to distinguish a vehicle and a non-vehicle (road surface) (S701). If negative (S701/N0), the obstacle candidate is classified to be a non-obstacle (S702). If affirmative (S701/YES), on the other hand, a further determination is made as to whether the distance threshold Lfi is equal to or smaller than a second distance threshold Lfi_th12 (S703). If negative (S703/N0), the obstacle candidate is classified to be an obstacle. If affirmative (S703/YES), on the other hand, the reflection intensity filter section 53 calculates statistical values based on reflection intensity information of the obstacle candidate (S208). As in FIG. 9, the reflection intensity filter section 53 performs processing from step S209 to S216.

The second distance threshold Lfi_th12 has a value greater than the first distance threshold Lfi_th11, and is a distance threshold to be used for selecting only those which apparently have strong reflection intensity, like vehicles.

This modification uses the characteristics that in a range near the mining work machine, an electromagnetic wave radiated from the peripheral detection sensor 2 such as a millimeter wave radar does not hit a road surface and has a low possibility of falsely detecting the road surface from the relationship between the installation height of the millimeter wave radar and the radiation range in the up-and-down direction and that in a range more distant than a medium distance, reflected waves from the road surface are weaker and the possibility of falsely detecting the road surface is lowered. This modification suppresses the false detection of a road surface by classifying, as a non-obstacle candidate, a stationary object detected in an area other than near the mining work machine and an area more distant than the medium distance, where the possibility of false detection of the road surface is relatively high.

Example 2 of Obstacle Candidate Discrimination Processing in State at or Immediately after Start Referring to FIG. 16, a description will be made about Example 2 of the obstacle candidate discrimination processing in a state at or immediately after a start. FIG. 16 is a flow chart illustrating a flow of Example 2 of the obstacle candidate discrimination processing in the state at or immediately after the start.

A determination that distinguishes an obstacle and a non-obstacle in the state at or immediately after the start is performed, for example, as illustrated in FIG. 16. In step S301 of Example 1 of the obstacle candidate discrimination processing in the state at or immediately after the start as illustrated in FIG. 10, the distance filter section 52 determines whether the distance Lfi is equal to or smaller than the start distance threshold Lfi_th2 set beforehand to distinguish a vehicle and a non-vehicle (road surface) (S301). If negative (S301/NO), the obstacle candidate is classified as a non-obstacle (S302). If affirmative (S301/YES), on the other hand, the obstacle candidate may be classified as an obstacle (S801).

This modification uses the characteristics that only vehicles existing near the mining work machine need to be detected in the state at or immediately after the start and that in a range near the mining work machine, an electromagnetic wave radiated from a peripheral detection sensor such as a millimeter wave radar does not hit a road surface and has a low possibility of falsely detecting the road surface from the relationship between the installation height of the millimeter wave radar and the radiation range in the up-and-down direction. This modification can achieve both the suppression of false detection of a road surface and the secure detection of vehicles by classifying all stationary object s, which are detected at the threshold of the distance filter or shorter, as obstacle candidates.

As described above, according to this embodiment, if a dump truck has detected obstacle candidates by a peripheral detection sensor such as a millimeter wave radar, a determination is made from travel speed information or the like on the mining work machine as to whether the mining work machine is in a normal travel state or in a state at or immediately after a start, and the obstacle candidates classified to be stationary objects according to the respective states thereof are classified into non-obstacles and obstacles, whereby false detection of non-obstacles as obstacles is suppressed while increasing the detection accuracy of the obstacles. As a consequence, it is possible to suppress unnecessary decelerations, stops and alarm operation.

The above-described embodiment does not restrict the present invention, and various modifications without departing from the spirit of the present invention are included in the present invention. For example, the foregoing embodiment has been described to facilitate the understanding of the present invention, and therefore the present invention shall not be absolutely restricted to those including all the configurations described.

For example, the reflection intensity filter section 53 is applied not only to stationary objects the travel speeds Vob of which are close to zero, but may also be applied likewise to moving objects, for example, traveling vehicles.

The configurations described in this embodiment are not limited to mining work machines, but can also be applied to vehicles, which travel at construction sites, and general automotive vehicles, and can bring about similar advantageous effects.

LEGENDS

1 . . . dump truck (mining haul vehicle), 2 . . . peripheral detection sensor, 5 . . . obstacle discrimination device, 10 . . . control server

The invention claimed is:

1. A mining work machine comprising:
a peripheral detection sensor configured to radiate an electromagnetic wave forward in a traveling direction, to receive reflected waves from each obstacle candidate, to detect reception intensities of the reflected waves and distances from the mining work machine to the obstacle candidate, and to output obstacle information including the detected reception intensities of the reflected waves and the detected distances,
a speed sensor that detects a travel speed of the mining work machine,
an obstacle discrimination device connected to the peripheral detection sensor and speed sensor, respectively, and configured to discriminate the obstacle candidate as an obstacle or a non-obstacle, and
a vehicle control device connected to the obstacle discrimination device, and configured to acquire an output from the obstacle discrimination device, wherein:
the obstacle discrimination device comprises:
a mining work machine-state determination section configured to determine, based on the travel speed acquired from the speed sensor, whether the mining work machine is in a state at or immediately after a start, including a stopped state or an immediately-after-start state, in which the mining work machine is traveling equal to or lower than a preset mining work machine-state determination speed threshold, or in a normal travel state in which the mining work machine is traveling faster than the mining work machine-state determination speed threshold,
a distance filter section that performs filtering processing on the obstacle information based on the distance at which the obstacle candidate was first detected by the peripheral detection sensor, and
a reflection intensity filter section that performs filtering processing on the obstacle information based on the reception intensities of the reflected waves from the obstacle candidate;
the distance filter section comprises:
a distance threshold selector configured to select an at- or immediately-after-start distance threshold as a distance threshold set to determine the obstacle candidate to be a non-obstacle if the mining work machine has been determined by the mining work machine-state determination section to be in the state at or immediately after the start, or to select a normal distance threshold as a distance threshold set to determine the obstacle candidate to be a non-obstacle if the mining work machine has been determined by the mining work machine-state determination section to be in the normal travel state,
a distance comparator that compares the distance, at which the obstacle candidate was first detected by the peripheral detection sensor, with the distance threshold selected by the distance threshold selector, a first non-obstacle determination processor configured to determine, based on a comparison result by the distance comparator, whether the obstacle candidate is a non-obstacle, and a first output processor configured to exclude the obstacle information, which indicates the obstacle candidate determined to be the non-obstacle based on a determination result by the first non-obstacle determination processor, and to output, to the reflection intensity filter section, the obstacle information which indicates the obstacle candidate not determined to be the non-obstacle based on the comparison result by the first non-obstacle determination processor; and the reflection intensity filter section comprises:

a reflection intensity threshold selector configured to select an at- or immediately-after-start reflection intensity threshold as a reflection intensity threshold set to determine the obstacle candidate as a non-obstacle if the mining work machine has been determined to be in the state at or immediately after the start by the mining work machine-state determination section, or to select a normal reflection intensity threshold as a reflection intensity threshold set to determine the obstacle candidate to be a non-obstacle if the mining work machine has been determined to be in the normal travel state by the mining work machine-state determination section, a reflection intensity comparator that compares the reception intensity of the reflected wave in the obstacle information acquired from the first output processor with the reflection intensity threshold selected by the reflection intensity threshold selector, a second non-obstacle determination processor configured to determine, based on a comparison result by the reflection intensity comparator, whether the obstacle candidate is a non-obstacle, and a second output processor configured to exclude the obstacle information, which indicates the obstacle candidate determined to be the non-obstacle based on a determination result by the second non-obstacle determination processor, and to output, to the vehicle control device, the obstacle information which indicates the obstacle candidate not determined to be the non-obstacle based on the determination result by the second non-obstacle determination processor.

2. The mining work machine according to claim 1, wherein:

the obstacle discrimination device further comprises a timer configured to measure a duration of a state in which the travel speed of the mining work machine as detected by the speed sensor is equal to or lower than the mining work machine-state determination speed threshold; and the mining work machine-state determination section is configured to determine that the mining work machine is in the state at or immediately after the start if the duration measured by the timer is equal to or longer than a preset stopped duration threshold.

3. The mining work machine according to claim 2, wherein:

the mining work machine-state determination section is configured to determine that the mining work machine is in the state at or immediately after the start if the duration is equal to or longer than the stopped duration threshold and the travel speed of the mining work machine as detected by the speed sensor is equal to or lower than a low speed determination speed threshold still smaller than the mining work machine-state determination speed threshold.

4. The mining work machine according to claim 1, wherein:

the peripheral detection sensor is configured to further detect a relative speed of the obstacle candidate to the mining work machine and to output the obstacle information with the relative speed included therein;

the obstacle discrimination device further comprises a moving object determination section configured to determine, based on the travel speed of the mining work machine as detected by the speed sensor and the relative speed of the obstacle candidate as detected by the peripheral detection sensor, which of a moving object or a stationary object the obstacle candidate is; and the moving object determination section is configured to output obstacle information, which indicates the obstacle candidate determined to be the stationary object, to the distance filter section or to output obstacle information, which indicates the obstacle candidate determined to be the moving object, to the vehicle control device.

5. The mining work machine according to claim 4, wherein:

the mining work machine further comprises a shift position sensor that detects a position of a shift lever which changes the traveling direction to forward or backward;

the peripheral detection sensor comprises a front peripheral detection sensor that monitors forward of the mining work machine and a rear peripheral detection sensor that monitors backward of the mining work machine;

the obstacle discrimination device further comprises an input selector switch, which alternatively selects a path through which obstacle information from the front peripheral detection sensor is inputted to the moving object determination section, or a path through which obstacle information from the rear peripheral detection sensor is inputted to the moving object determination section, and an input selection controller that performs selection control of the input selector switch;

the mining work machine-state determination section is configured to acquire the position of the shift lever from the shift position sensor and to output, to the input selection controller, a determination results as to which of forward or backward the traveling direction of the mining work machine is; and the input selection controller is configured to perform selection control on the input selector switch based on the determination result by the mining work machine-state determination section so that the obstacle information from the front peripheral detection sensor is inputted to the moving object determination section when traveling forward but the obstacle information from the rear peripheral detection sensor is inputted to the moving object determination section when traveling backward.

6. An obstacle discrimination device connected to a peripheral detection sensor, which is configured to radiate an electromagnetic wave forward in a traveling direction of a mining work machine, to receive reflected waves from each obstacle candidate, to detect reception intensities of the reflected waves and distances from the mining work machine to the obstacle candidate, and to output obstacle information including the detected reception intensities of the reflected waves and the detected distances, a speed sensor that detects a travel speed of the mining work machine, and a vehicle control device for the mining work machine, the peripheral detection sensor, speed sensor and the vehicle control device being mounted on the mining work machine, and configured to discriminate the obstacle candidate as an obstacle or a non-obstacle, wherein:

the obstacle discrimination device comprises:

a mining work machine-state determination section configured to determine, based on the travel speed acquired from the speed sensor, whether the mining work machine is in a state at or immediately after the start, including a stopped state or an immediately-after-start state, in which the mining work machine is traveling equal to or lower than a preset mining work machine-state determination speed threshold, or in a normal travel state in which the mining work machine is traveling faster than the mining work machine-state determination speed threshold, a distance filter section that performs filtering processing on the obstacle information based on the distance at which the obstacle candidate was first detected by the peripheral detection sensor, and a reflection intensity filter section that performs filtering processing on the obstacle information based on the reception intensities of the reflected waves from the obstacle candidate;

the distance filter section comprises:

a distance threshold selector configured to select an at- or immediately-after-start distance threshold as a distance threshold set to determine the obstacle candidate to be a non-obstacle if the mining work machine has been determined by the mining work machine-state determination section to be in the state at or immediately after the start, or to select a normal distance threshold as a distance threshold set to determine the obstacle candidate to be a non-obstacle if the mining work machine has been determined by the mining work machine-state determination section to be in the normal travel state, a distance comparator that compares the distance, at which the obstacle candidate was first detected by the peripheral detection sensor, with the distance threshold selected by the distance threshold selector, a first non-obstacle determination processor configured to determine, based on a comparison result by the distance comparator, whether the obstacle candidate is a non-obstacle, and a first output processor configured to exclude the obstacle information, which indicates the obstacle candidate determined to be the non-obstacle based on a determination result by the first non-obstacle determination processor, and to output, to the reflection intensity filter section, the obstacle information which indicates the obstacle candidate not determined to be the non-obstacle based on the comparison result by the first non-obstacle determination processor; and the reflection intensity filter section comprises:

a reflection intensity threshold selector configured to select an at- or immediately-after-start reflection intensity threshold as a reflection intensity threshold set to determine the obstacle candidate to be a non-obstacle if the mining work machine has been determined to be in the state at or immediately after the start by the mining work machine-state determination section, or to select a normal reflection intensity threshold as a reflection intensity threshold set to determine the obstacle candidate to be a non-obstacle if the mining work machine has been determined to be in the normal travel state by the mining work machine-state determination section, a reflection intensity comparator that compares the reception intensity of the reflected wave in the obstacle information acquired from the first output processor with the reflection intensity threshold selected by the reflection intensity threshold selector, a second non-obstacle determination processor configured to determine, based on a comparison result by the reflection intensity comparator, whether the obstacle candidate is a non-obstacle, and a second output processor configured to exclude the obstacle information, which indicates the obstacle candidate determined to be the non-obstacle based on a determination result by the second non-obstacle determination processor, and to output, to the vehicle control device, the obstacle information which indicates the obstacle candidate not determined to be the non-obstacle based on the determination result by the second non-obstacle determination processor.

* * * * *